United States Patent
Badal-Badalian et al.

(10) Patent No.: US 12,530,683 B2
(45) Date of Patent: Jan. 20, 2026

(54) SYSTEM AND METHOD FOR ELECTRONIC CREDENTIAL TOKENIZATION

(71) Applicant: ROYAL BANK OF CANADA, Toronto (CA)

(72) Inventors: Arnold Badal-Badalian, Toronto (CA); Edison U. Ortiz, Orlando, FL (US); Ambica Pawan Khandavilli, Orlando, FL (US); Seung Bong Baek, Toronto (CA); Manuel Roggero, Orlando, FL (US); Raghavendra Agrawal, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/352,174

(22) Filed: Jun. 18, 2021

(65) Prior Publication Data

US 2021/0312440 A1 Oct. 7, 2021

Related U.S. Application Data

(63) Continuation-in-part of application No. 17/080,197, filed on Oct. 26, 2020, now Pat. No. 11,615,414, and
(Continued)

(51) Int. Cl.
*G06Q 20/40* (2012.01)
*G06Q 20/32* (2012.01)
(Continued)

(52) U.S. Cl.
CPC .......... *G06Q 20/40* (2013.01); *G06Q 20/322* (2013.01); *G06Q 20/3221* (2013.01);
(Continued)

(58) Field of Classification Search
None
See application file for complete search history.

(56) References Cited

U.S. PATENT DOCUMENTS 6,820,201 B1 11/2004 Lincoln
7,401,361 B2 7/2008 Freeman
(Continued)

FOREIGN PATENT DOCUMENTS

CA 2807972 A1 2/2012
EP 1085443 A2 3/2001
(Continued)

OTHER PUBLICATIONS

Office Action dated Jul. 14, 2022 issued in CA 2961916.
(Continued)

*Primary Examiner* — Gregory S Cunningham, II
(74) *Attorney, Agent, or Firm* — NORTON ROSE FULBRIGHT CANADA LLP

(57) ABSTRACT

A computer system and method for tokenizing an IoT device is provided. The system comprises at least one processor and a memory storing instructions which when executed by the processor configure the processor to perform the method. The method obtaining device information, generating a credential token based on the device information, and processing an electronic transaction using the credential token.

20 Claims, 21 Drawing Sheets

Related U.S. Application Data a continuation-in-part of application No. 16/521,238, filed on Jul. 24, 2019, now Pat. No. 11,539,525, and a continuation-in-part of application No. 16/521,569, filed on Jul. 24, 2019, now Pat. No. 11,277,412, which is a continuation-in-part of application No. 16/424,242, filed on May 28, 2019, now Pat. No. 10,956,585, application No. 17/352,174 is a continuation-in-part of application No. 15/884,847, filed on Jan. 31, 2018, and a continuation-in-part of application No. 15/201,428, filed on Jul. 2, 2016, now Pat. No. 11,080,701, said application No. 15/884,847 is a continuation-in-part of application No. 15/201,428, filed on Jul. 2, 2016, now Pat. No. 11,080,701, which is a continuation-in-part of application No. 15/000,685, filed on Jan. 19, 2016, now Pat. No. 11,080,700, application No. 17/352,174 is a continuation-in-part of application No. 15/000,685, filed on Jan. 19, 2016, now Pat. No. 11,080,700, said application No. 17/080,197 is a continuation of application No. 14/705,477, filed on May 6, 2015, now Pat. No. 10,846,692, which is a continuation of application No. 14/056,440, filed on Oct. 17, 2013, now Pat. No. 9,082,119.

(60) Provisional application No. 63/077,443, filed on Sep. 11, 2020, provisional application No. 63/040,896, filed on Jun. 18, 2020, provisional application No. 62/839,384, filed on Apr. 26, 2019, provisional application No. 62/824,697, filed on Mar. 27, 2019, provisional application No. 62/806,394, filed on Feb. 15, 2019, provisional application No. 62/775,695, filed on Dec. 5, 2018, provisional application No. 62/774,130, filed on Nov. 30, 2018, provisional application No. 62/751,369, filed on Oct. 26, 2018, provisional application No. 62/702,635, filed on Jul. 24, 2018, provisional application No. 62/702,871, filed on Jul. 24, 2018, provisional application No. 62/697,140, filed on Jul. 12, 2018, provisional application No. 62/691,406, filed on Jun. 28, 2018, provisional application No. 62/677,133, filed on May 28, 2018, provisional application No. 62/452,629, filed on Jan. 31, 2017, provisional application No. 62/200,859, filed on Aug. 4, 2015, provisional application No. 62/188,067, filed on Jul. 2, 2015, provisional application No. 62/105,061, filed on Jan. 19, 2015, provisional application No. 61/863,593, filed on Aug. 8, 2013, provisional application No. 61/833,188, filed on Jun. 10, 2013, provisional application No. 61/825,865, filed on May 21, 2013, provisional application No. 61/811,783, filed on Apr. 14, 2013, provisional application No. 61/715,142, filed on Oct. 17, 2012.

(51) Int. Cl.
*G06Q 20/36* (2012.01)
*G06Q 20/38* (2012.01)

(52) U.S. Cl.
CPC ..... *G06Q 20/3223* (2013.01); *G06Q 20/3278* (2013.01); *G06Q 20/36* (2013.01); *G06Q 20/38215* (2013.01); *G06Q 20/3823* (2013.01); *G06Q 20/3829* (2013.01); *G06Q 20/385* (2013.01); *G06Q 20/367* (2013.01); *G06Q 20/3672* (2013.01); *G06Q 2220/00* (2013.01)

(56) References Cited

U.S. PATENT DOCUMENTS

| | | |
|---|---|---|
| 7,434,068 B2 | 10/2008 | Nguyen |
| 7,739,197 B2 | 6/2010 | Jambunathan et al. |
| 8,219,811 B2 | 7/2012 | Roundtree |
| 8,386,790 B2 | 2/2013 | Bhattacharya |
| 8,683,605 B1 | 3/2014 | Tenenboym |
| 9,258,331 B2 | 2/2016 | Dyer |
| 9,336,519 B2 | 5/2016 | Young |
| 9,424,574 B2 | 8/2016 | Bondesen et al. |
| 9,774,578 B1 | 9/2017 | Ateniese |
| 10,078,835 B2 | 9/2018 | Radu |
| 10,448,251 B1 | 10/2019 | Maria |
| 10,509,949 B1* | 12/2019 | Mossoba ............... G06Q 20/28 |
| 10,523,685 B1 | 12/2019 | Kostka |
| 10,693,872 B1 | 6/2020 | Larson |
| 10,949,830 B1* | 3/2021 | Gaudin ............... G06Q 20/322 |
| 10,956,585 B2 | 3/2021 | Ortiz |
| 11,232,456 B2 | 1/2022 | Hyun |
| 2003/0005322 A1 | 1/2003 | Kiiveri |
| 2004/0123156 A1 | 6/2004 | Hammond |
| 2005/0058288 A1 | 3/2005 | Sundaram |
| 2006/0195692 A1 | 8/2006 | Kuhlman |
| 2007/0101434 A1 | 5/2007 | Jevans |
| 2008/0072064 A1* | 3/2008 | Franchi ................. G06F 21/34 713/186 |
| 2008/0133350 A1 | 6/2008 | White |
| 2008/0262969 A1 | 10/2008 | Samid |
| 2010/0049875 A1 | 2/2010 | Lu |
| 2010/0122274 A1 | 5/2010 | Gillies et al. |
| 2010/0211440 A1* | 8/2010 | Leshem ................ G06Q 20/40 705/13 |
| 2010/0241867 A1 | 9/2010 | Brown |
| 2011/0072269 A1 | 3/2011 | Takechi |
| 2011/0208659 A1* | 8/2011 | Easterly ............ G06Q 20/3274 705/79 |
| 2011/0274275 A1 | 11/2011 | Seitz |
| 2012/0036042 A1 | 2/2012 | Graylin |
| 2012/0159195 A1 | 6/2012 | von Behren |
| 2012/0209657 A1* | 8/2012 | Connolly ........... G06Q 20/3224 705/26.7 |
| 2012/0209730 A1 | 8/2012 | Garrett |
| 2012/0290376 A1 | 11/2012 | Dryer |
| 2013/0124346 A1 | 5/2013 | Baldwin et al. |
| 2013/0214898 A1* | 8/2013 | Pineau ................. H04W 4/023 340/5.6 |
| 2013/0218769 A1 | 8/2013 | Pourfallah et al. |
| 2013/0268687 A1* | 10/2013 | Schrecker ............ H04W 12/06 709/229 |
| 2013/0311313 A1 | 11/2013 | Laracey |
| 2014/0019358 A1* | 1/2014 | Priebatsch ......... G06Q 20/3274 705/44 |
| 2014/0025581 A1 | 1/2014 | Calman |
| 2014/0025958 A1 | 1/2014 | Calman |
| 2014/0101453 A1 | 4/2014 | Senthurpandi |
| 2014/0108785 A1 | 4/2014 | Lindteigen |
| 2014/0108805 A1 | 4/2014 | Smith |
| 2014/0157423 A1 | 6/2014 | Edelsten |
| 2014/0278894 A1 | 9/2014 | Toumayan |
| 2014/0310162 A1 | 10/2014 | Collins |
| 2015/0046330 A1 | 2/2015 | Hanafi |
| 2015/0163206 A1 | 6/2015 | McCarthy |
| 2015/0262170 A1* | 9/2015 | Bouda ................ G06Q 20/322 705/67 |
| 2015/0347734 A1 | 12/2015 | Beigi |
| 2016/0073263 A1 | 3/2016 | Wolosewicz |
| 2016/0162897 A1 | 6/2016 | Feeney |
| 2016/0344635 A1 | 11/2016 | Lee |
| 2017/0046669 A1* | 2/2017 | Chow ............... G06Q 10/0631 |
| 2017/0085562 A1 | 3/2017 | Schultz |
| 2017/0093806 A1 | 3/2017 | Phegade |
| 2017/0127230 A1* | 5/2017 | Enriquez ................ H04W 4/48 |
| 2017/0149560 A1 | 5/2017 | Shah |
| 2017/0180128 A1 | 6/2017 | Lu |
| 2017/0270524 A1 | 9/2017 | Kim |
| 2017/0294131 A1 | 10/2017 | Jedrzejewski |

(56) References Cited

U.S. PATENT DOCUMENTS

| | | | |
|---|---|---|---|
| 2017/0372226 A1 | 12/2017 | Costa | |
| 2018/0114220 A1 | 4/2018 | Ekberg | |
| 2018/0181955 A1* | 6/2018 | Woods | G06Q 20/4014 |
| 2018/0262493 A1 | 9/2018 | Andrade | |
| 2018/0270065 A1 | 9/2018 | Brown | |
| 2018/0337776 A1 | 11/2018 | Miller | |
| 2019/0004789 A1 | 1/2019 | Mills | |
| 2019/0034924 A1* | 1/2019 | Prabhu | G06Q 20/3821 |
| 2019/0036914 A1 | 1/2019 | Tzur-David | |
| 2019/0036932 A1 | 1/2019 | Bathen | |
| 2019/0144153 A1 | 5/2019 | Schaub | |
| 2019/0156326 A1 | 5/2019 | Todasco | |
| 2019/0259228 A1 | 8/2019 | Truong | |
| 2019/0288837 A1 | 9/2019 | St Amant | |
| 2020/0145219 A1 | 5/2020 | Sebastian | |
| 2022/0292482 A1* | 9/2022 | Hamdan | G06Q 20/409 |

FOREIGN PATENT DOCUMENTS

| | | | |
|---|---|---|---|
| EP | 1116148 A1 | 7/2001 | |
| EP | 2587432 A1 | 5/2013 | |
| WO | 2012158419 A1 | 11/2012 | |
| WO | 2014049136 A1 | 4/2014 | |
| WO | 2019098873 A1 | 5/2019 | |
| WO | WO-2021204411 A1 * | 10/2021 | G06Q 20/3223 |

OTHER PUBLICATIONS

Office Action dated Sep. 2, 2022 issued in CA 3126471.
Office Action dated Sep. 14, 2022 issued in CA 2963287.
Office Action dated Sep. 21, 2022 issued in U.S. Appl. No. 14/869,186.
Office Action dated Sep. 30, 2022 issued in U.S. Appl. No. 14/879,913.
Office Action dated Sep. 2, 2022 issued in CN 201780028338.X.
De, P. et al., Towards an interoperable mobile wallet service, 2013 10th International Conference and Expo on Emerging Technologies for a Smarter World (CEWIT), 2013, pp. 1-6, doi: 10.1109/CEWIT.2013.6713767.
Office Action dated Jun. 17, 2022 issued in U.S. Appl. No. 15/648,942.
Office Action dated Jun. 2, 2022 issued in U.S. Appl. No. 14/869,186.
Office Action dated Mar. 2, 2022 issued in CN 201780028338.X.
Office Action dated Jul. 26, 2022 issued in AU 2021203226.
Office Action dated Aug. 2, 2022 issued in AU 2021203623.
Office Action dated Aug. 2, 2022 issued in EP 16739695.1.
Office Action dated Mar. 30, 2022 issued in U.S. Appl. No. 14/879,913.
Office Action dated Mar. 1, 2022 issued in CA 2974151.
Office Action dated Mar. 4, 2022 issued in U.S. Appl. No. 15/648,942.
Office Action dated Mar. 21, 2022 issued in U.S. Appl. No. 15/884,847.
Office Action dated Jan. 20, 2022 issued in AU 2017231106.
Notice of Allowance dated Feb. 7, 2022 issued in U.S. Appl. No. 16/007,955.
Balan, R.K. et al., "The Digital Wallet: Opportunities and Prototypes", in Computer, vol. 42, No. 4, pp. 100-102, Apr. 2009, doi: 10.1109/MC.2009.134 (Year: 2009).
Summons to Oral Proceedings dated Jul. 1, 2021 issued in EP 17762362.6.
Office Action dated Jun. 30, 2021 issued in CN 201780028338.X.
Notice of Allowance dated Aug. 19, 2021 issued in U.S. Appl. No. 15/453,193.
Office Action dated Aug. 30, 2021 issued in U.S. Appl. No. 15/648,942.
Office Action dated Oct. 13, 2021 issued in U.S. Appl. No. 15/884,847.
Office Action dated Oct. 25, 2021 issued in CA 2963287.
Office Action dated Oct. 5, 2021 issued in CA 2961916.
Office Action dated Nov. 26, 2021 issued in U.S. Appl. No. 14/879,913.
Summons to Oral Proceedings dated Dec. 14, 2021 issued in EP 15846067.5.
Office Action dated Nov. 29, 2021 issued in CN 201580067059.5.
Office Action dated Dec. 27, 2021 issued in U.S. Appl. No. 14/869,186.
Notice of Allowance dated Nov. 15, 2021 issued in AU 2016208989.
European Extended Search Report dated Oct. 21, 2022 issued in EP 22173329.8.
Office Action dated Jun. 3, 2020 issued in CA 3060835.
Office Action dated Apr. 26, 2021 issued in CA 3060835.
European Extended Search Report dated Jan. 26, 2022 issued in EP 19812339.0.
Office Action dated Jul. 7, 2022 issued in IN 202027052946.
Notice of Allowance dated Nov. 5, 2020 issued in U.S. Appl. No. 16/424,242.
Office Action dated Jan. 27, 2022 issued in U.S. Appl. No. 17/169,221.
Office Action dated Jun. 30, 2022 issued in U.S. Appl. No. 17/169,221.
Office Action dated Mar. 14, 2022 issued in U.S. Appl. No. 16/521,238.
Notice of Allowance dated Aug. 19, 2022 issued in U.S. Appl. No. 16/521,238.
Camenisch, J et al., "Design and Implementation of the idemix Anonymous Credential System", IBM Research, Zurich Research Laboratory, May 2003, p. 1-27, https://www.researchgate.net/publication/2570056_Design_and_Implementation_of_the_idemix_Anonymous_Credential_System.
Belenkiy, M et al., "Randomizable Proofs and Delegatable Anonymous Credentials", Crypto 2009, LNCS 5677, p. 108-125, 2009.
Boneh, D. et al., "Identity-Based Encryption from the Wiel Pairing", Siam J of Computing, vol. 32, No. 3, p. 568-615, 2003.
Groth, J et al., "Efficient Non-Interactive Proof Systems for Bilinear Groups", Eurocrypt 2008, LNCS 4965, p. 416-432, 2008.
Paquin, C., "U-Prove Technology Overview V1.1 Revision 2", Microsoft Corporation, p. 1-23, Apr. 2013.
Paquin, C. et al., "U-Prove Cryptographic Specification V1.1 Revision 3" Microsoft Corporation, p. 1-23, Dec. 2013.
Notice of Allowance dated Jul. 13, 2021 issued in U.S. Appl. No. 16/521,569.
Notice of Allowance dated Nov. 8, 2021 issued in U.S. Appl. No. 16/521,569.
Notice of allowance dated Oct. 26, 2022 issued in U.S. Appl. No. 15/648,942.
Notice of allowance dated Dec. 29, 2022 issued in U.S. Appl. No. 17/080,197.
Lampropoulos et al. "Identity Management Directions in Future Internet", IEEE Communications Magazine, Dec. 2011, pp. 74-83 (Year: 2011).
Notice of acceptance dated Dec. 22, 2022 issued in AU 2017231106.
European Extended Search Report dated Jan. 19, 2023 issued in EP 22187813.5.
Office Action dated Oct. 27, 2022 issued in CA 2991073.
Office Action dated Nov. 8, 2022 issued in U.S. Appl. No. 15/884,847.
Office Action dated Mar. 14, 2023 issued in U.S. Appl. No. 14/869,186.
Notice of allowance dated Feb. 27, 2023 issued in U.S. Appl. No. 17/389,984.
Notice of allowance dated Feb. 15, 2023 issued in U.S. Appl. No. 17/387,711.
Ex Parte Quayle Action dated Mar. 23, 2023 issued in U.S. Appl. No. 17/561,638.
Office Action dated Mar. 9, 2023 issued in AU 2022201325.
Office Action Jan. 31, 2023 issued in KR 10-2018-7003235.
Office Action dated May 23, 2023 issued in U.S. Appl. No. 14/879,913.
Office Action dated Jun. 8, 2023 issued in AU 2022202404.
Office Action dated May 17, 2023 issued in CA 3017026.
Office Action dated Jul. 24, 2023 issued in AU 2021203623.
Office Action dated Jul. 20, 2023 issued in CA 2991073.
Office Action dated Apr. 19, 2023 issued in U.S. Appl. No. 15/884,847.

* cited by examiner

SYSTEM AND METHOD FOR ELECTRONIC CREDENTIAL TOKENIZATION

CROSS-REFERENCE

This application is a non-provisional of, and claims all benefit, including priority to U.S. Application No. 63/040,896, filed Jun. 18, 2020; and U.S. Application No. 63/077,443, filed Sep. 11, 2020, all of which are entitled SYSTEM AND METHOD FOR ELECTRONIC CREDENTIAL TOKENIZATION.

This application is also a continuation-in-part of U.S. application Ser. No. 16/521,238, filed Jul. 24, 2019, which is entitled SYSTEM AND METHOD FOR SECURE TOKENIZED CREDENTIALS, which claims priority to U.S. Provisional Application No. 62/839,384, filed Apr. 26, 2019 which is entitled SYSTEM AND METHOD FOR SECURE TOKENIZED CREDENTIALS; U.S. Provisional Application No. 62/775,695, filed Dec. 5, 2018 which is entitled SYSTEM AND METHOD FOR SECURE TOKENIZED CREDENTIALS; U.S. Provisional Application No. 62/774,130, filed Nov. 30, 2018 which is entitled SYSTEM AND METHOD FOR FACIAL IMAGE PROCESSING; U.S. Provisional Application No. 62/751,369, filed Oct. 26, 2018 which is entitled SYSTEM AND METHOD FOR FACIAL RECOGNITION; and U.S. Provisional Application No. 62/702,635, filed Jul. 24, 2018 which is entitled SYSTEM AND METHOD FOR FACIAL RECOGNITION.

This application is also a continuation-in-part of U.S. application Ser. No. 16/521,569, filed Jul. 24, 2019, which claims priority to U.S. Provisional Application No. 62/702,871, filed Jul. 24, 2018; and U.S. application Ser. No. 16/521,569 is a continuation-in-part of U.S. application Ser. No. 16/424,242, filed May 28, 2019 and issued on Mar. 23, 2021 as U.S. Pat. No. 10,956,585 which claims priority to U.S. Provisional Application No. 62/824,697 filed Mar. 27, 2019; U.S. Provisional Application No. 62/697,140 filed Jul. 12, 2018; U.S. Provisional Application No. 62/691,406 filed Jun. 28, 2018; U.S. Provisional Application No. 62/806,394 filed Feb. 15, 2019; and U.S. Provisional Application No. 62/677,133 filed May 28, 2018; all of which are entitled SYSTEM AND METHOD FOR SECURE ELECTRONIC TRANSACTION PLATFORM.

This application is also a continuation-in-part of U.S. application Ser. No. 15/884,847, filed Jan. 31, 2018 which claims priority to U.S. Provisional Application No. 62/452,629, filed Jan. 31, 2017; all of which are entitled SECURE PROCESSING OF ELECTRONIC PAYMENTS; and U.S. application Ser. No. 15/884,847 is a continuation-in-part of Ser. No. 15/201,428, filed Jul. 2, 2016 which claims priority to U.S. Provisional Application No. 62/200,859 filed Aug. 4, 2015; and U.S. Patent Application No. 62/188,067 filed Jul. 2, 2015; all of which are entitled SECURE PROCESSING OF ELECTRONIC PAYMENTS; and U.S. application Ser. No. 15/201,428 is a continuation-in-part of U.S. application Ser. No. 15/000,685, filed Jan. 19, 2016 which claims priority to U.S. Provisional Application No. 62/105,061 filed Jan. 19, 2015; U.S. Provisional Application No. 62/188,067 filed Jul. 2, 2015; U.S. Patent Application 62/200,859 filed Aug. 4, 2015; all of which are entitled SECURE PROCESSING OF ELECTRONIC PAYMENTS.

This application is also a continuation-in-part of U.S. application Ser. No. 15/201,428, filed Jul. 2, 2016 which claims priority to U.S. Provisional Application No. 62/200,859 filed Aug. 4, 2015; and U.S. Patent Application No. 62/188,067 filed Jul. 2, 2015; all of which are entitled SECURE PROCESSING OF ELECTRONIC PAYMENTS; and U.S. application Ser. No. 15/201,428 is a continuation-in-part of U.S. application Ser. No. 15/000,685, filed Jan. 19, 2016 which claims priority to U.S. Provisional Application No. 62/105,061 filed Jan. 19, 2015; U.S. Provisional Application No. 62/188,067 filed Jul. 2, 2015; U.S. Patent Application 62/200,859 filed Aug. 4, 2015; all of which are entitled SECURE PROCESSING OF ELECTRONIC PAYMENTS.

This application is also a continuation-in-part of U.S. application Ser. No. 15/000,685, filed Jan. 19, 2016 which claims priority to U.S. Provisional Application No. 62/105,061 filed Jan. 19, 2015; U.S. Provisional Application No. 62/188,067 filed Jul. 2, 2015; U.S. Patent Application 62/200,859 filed Aug. 4, 2015; all of which are entitled SECURE PROCESSING OF ELECTRONIC PAYMENTS.

This application is also a continuation-in-part of U.S. application Ser. No. 17/080,197, filed Oct. 26, 2020 and entitled VIRTUALIZATION AND SECURE PROCESSING OF DATA which is a continuation of U.S. application Ser. No. 14/705,477, filed May 6, 2015 and issued on Nov. 24, 2020 as U.S. Pat. No. 10,846,692, which is a continuation of U.S. application Ser. No. 14/056,440, filed Oct. 17, 2013 and issued on Jul. 14, 2015 as U.S. Pat. No. 9,082,119, which claims priority to U.S. Provisional Application No. 61/863,593 filed Aug. 8, 2013; U.S. Provisional Application No. 61/833,188 filed Jun. 10, 2013; U.S. Provisional Application No. 61/825,865 filed May 21, 2013; U.S. Provisional Application No. 61/811,783 filed Apr. 14, 2013; and U.S. Provisional Application No. 61/715,142 filed Oct. 17, 2012; all of which are entitled SECURE PROCESSING AND STORAGE OF PAYMENT DATA.

The contents of all of the above applications are hereby incorporated by reference in their entireties.

FIELD

The present disclosure relates generally to electronic transactions, and in particular to a system and method for electronic credential tokenization.

INTRODUCTION

Tokens may be used in electronic transactions.

Consumers place a level of trust in financial institutions and vendors when they make a purchase using a financial product (e.g., a credit card or a loyalty membership card), such that their private information, such as the transaction data, would not be exposed to other parties without explicit consent from the consumers. At the same time, consumers respond better to personalized offers than to unpersonalized recommendations.

SUMMARY

In an embodiment, there is provided a system for processing electronic transactions. The system comprises at least one processor and a memory storing instructions which when executed by the processor configure the processor to obtain device information, generate a credential token based on the device information, and process an electronic transaction using the credential token.

In another embodiment, there is provided a method of processing electronic transactions. The method comprises obtaining device information, generating a credential token based on the device information, and processing an electronic transaction using the credential token.

In another embodiment, there is provided a system for processing electronic transactions. The system comprises at least one processor and a memory storing instructions which when executed by the processor configure the processor to receive an offer pertaining to a service to a device when the device is in proximity to a vendor providing the service, obtain device information, generate a credential token based on the device information, process an electronic transaction for the offer using the credential token, receive a service code in response to the electronic transaction, and process an electronic transaction for the service using the service code.

In another embodiment, there is provided a method of processing electronic transactions. The method comprises receiving an offer pertaining to a service to a device when the device is in proximity to a vendor providing the service, obtaining device information, generating a credential token based on the device information, processing an electronic transaction for the offer using the credential token, receiving a service code in response to the electronic transaction, and processing an electronic transaction for the service using the service code.

In another embodiment, there is provided a system for tokenizing an IoT device. The system comprises at least one processor and a memory storing instructions which when executed by the processor configure the processor to obtain IoT device information, generate a credential token based on the vehicle information, and process an electronic transaction using the credential token.

In another embodiment, there is provided a method of tokenizing an IoT device. The method comprises obtaining IoT device information, generating a credential token based on the vehicle information, and processing an electronic transaction using the credential token.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

The aggregation of retail experiences between the digital and physical world may blur the boundaries of purchasing into a "phygital" experience in which payments may shift as well. Retailers may demand a one-stop-shop solution for pay anywhere, touchless payments and check-in, higher level of data security, loyalty as a service, data insights and extended lending capabilities to better curate the purchasing experiences of the future. This will bolster a demand of traditional retailers for a white-label application that can deliver on all of the features mentioned above.

In some embodiments, retailers may be able to promote adoption of their applications in which payments and loyalty will be one of the main features driving customers towards downloads and consequent usage.

Credential Tokenization

Figure 1:
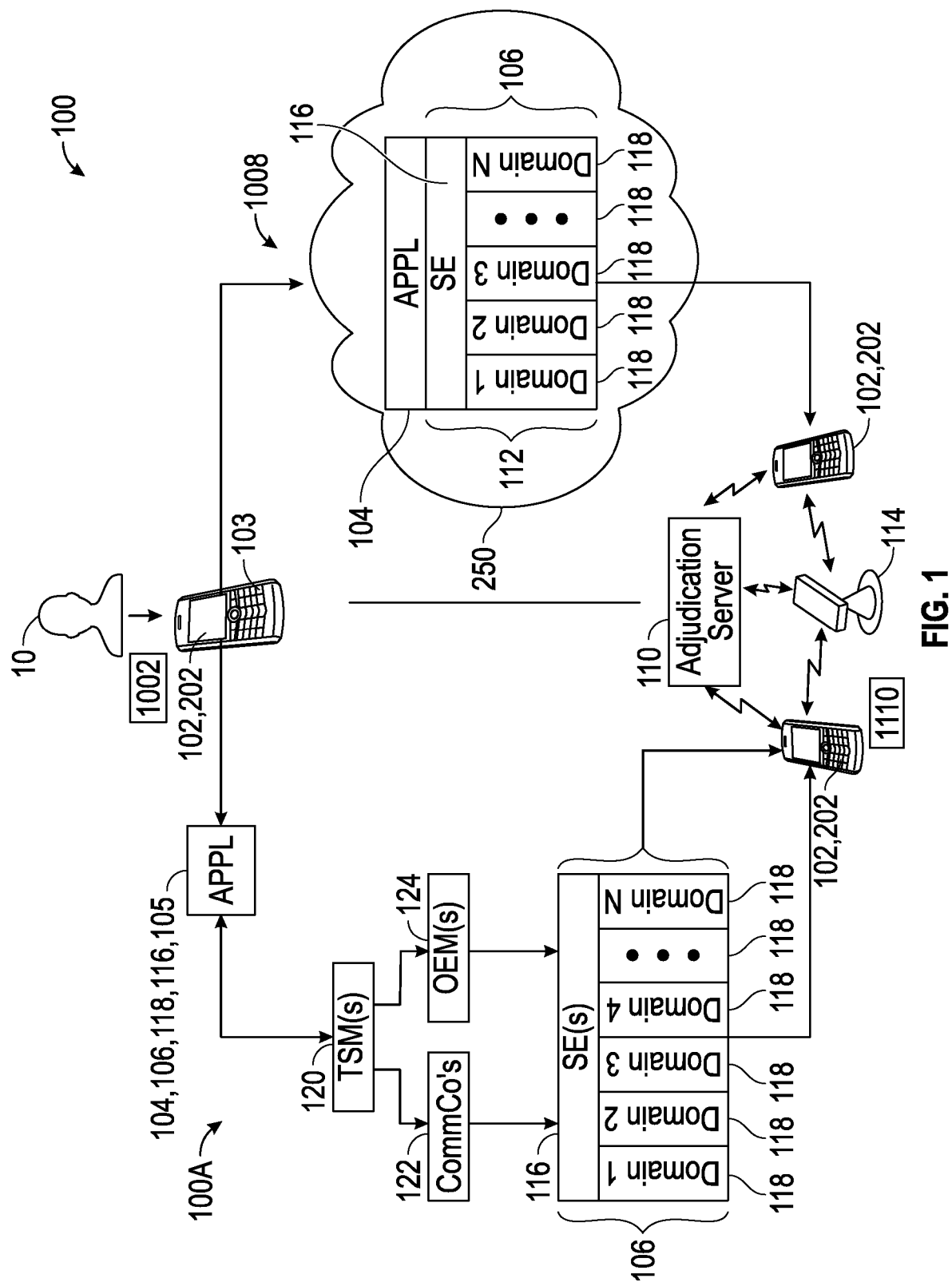
FIG. 1 illustrates, in a schematic diagram, an example of a credential tokenization system, in accordance with some embodiments.

FIG. 1 illustrates, in a schematic, an example of a tokenization system 100, in accordance with some embodiments. In the embodiment shown, system 100 and subsystems 100A, 100B comprise, among other components, one or more transaction or data processing request devices 102, such as mobile device(s) 202, 203, desktop device(s) 402 or other data processing devices; data processing applications 104, such as virtual wallet(s) useful in purchase transactions, or image processing applications; persistent memory(ies) 106; and transaction or authentication adjudication server(s) 110.

In the architecture/embodiment of 100A, application 104 and/or memory(ies) 106, 116, 118 are stored on the user device 102, 202. In the embodiment 100B, some or all of application(s) 104 and/or memory(ies) 106, 116, 118 are stored in secure storage in the cloud, for example in a secure networked server.

At 1002, a purchaser such as a smart card holder, or other user, 10 of a process or transaction request device 102 can use a keypad, keyboard, touchscreen, or other input device 103 to access a data processing application 104, which application can reside wholly or partially on any or all of request device 102, financial or other application server 112, and/or any other suitably-accessible networked processing device. Application(s) 104 can access persistent memory(ies) 106 to read or otherwise access identifiers associated with the purchaser or user; the request device 102, and/or application(s) 104, such as financial account information to be used in a purchase transaction, and or all of which identifiers may be stored in, for example, one or more secure element(s) 116, and/or (sub) domains 118 thereof.

For example, at 1002, a purchaser device such as a smart (or chip) card, or a mobile computing/communications device (PDA) such as a smart phone, tablet, or laptop computer, or networked processor such as a desktop computer, can be used to create, access, and/or otherwise process securely-stored data related to one or more purchaser accounts. In the storage embodiment shown at 100A, a secure element 116 comprising purchaser financial data, which can for example include account and/or pre-authorized payment Information (e.g., a secure payment token) is securely stored in persistent memory on the purchaser device 102. In the embodiment shown at 100B, such data is stored in a secure element (SE) such as a secure cloud-based communications facility, such as a cloud-based SSD, maintained or otherwise controlled in this example by a bank or other financial institution. In both cases, SE sub-domains 118 can be provided in the secure memory(ies) 106 and used, for example, to securely store authorization and other data related to a plurality of applications, such as, in a payment transaction context, purchaser and/or account information related to a number of different purchaser accounts ("Visa (VMPA)"; "Master Card," "PayPass," "MDA," "Debit (MDA)", and "VAS") and/or payments.

At 1110, at the bottom of FIG. 1, the same or another purchaser device 102, 202 is used to participate in a purchase or other transaction at a vendor or merchant point-of-sale (POS) device 114. such as an NFC (near-field communication) enabled device and/or card reader(s) 115.

Each of the (sub) systems 100A, 100B of FIG. 1 offers a variety of advantages. For example, in the embodiment shown at 100A, storage of application 104 and/or various types of authorization and transaction data in memory(ies) 106, 116, 118 on user or requesting device(s) 102, 202 enables the owner, administrator, and/or other user of the device 102, 202 to retain custody and control of the application 104 and/or memory(ies) 106, 116, 118, and responsibility therefor. For many users, this provides, for example, increased comfort in the knowledge that they themselves can provide ultimate security responsibility. Provisioning of such application(s) 104 and data stored in such elements 106, 116, 118 can be provided by any or all of communications service provider systems 122, original equipment manufacturers 124, and/or other trusted service provider or manager (TSM) systems 120, which can provide added value in the form of, for example, add-on applications and ancillary services.

The embodiment 100A allows an application wholly or partially stored on a device 102, 202, to provide security in binding the application to the specific device 102, 202, using hardware, firmware, or software features, using for example Global Platform (GP) standards. This can, for example, be used in either of embodiments 100A, 100B to confirm that a requesting user of a device 102, 202; the specific device 102, 202 used to generate the request; and account or other application information provided in a transaction or other data processing request are properly related, bound, to each other, and thereby, through comparison to authorization or authentication information stored by or otherwise available to an independent transaction or processing request adjudicator, to authorize a requested transaction or other data process.

By linking multiple, independent Identity and function factors, such three-fold or other multiple-factor authentication features, architectures such as that shown at 100B, provide markedly superior authorization/authentication possibilities.

By providing such multi-parameter authorization processes, in which some or all of application(s) 104 and/or various types of authorization and transaction data may be stored in memory(ies) 106, 116, 118 in secure devices in the cloud (i.e. in devices accessible to the devices 102, 220, 114, 120, etc., via any one or more public and/or private local or wide area networks 250), the tokenization system 100 provides a physical security for sensitive data; reduction(s) in the amount of inter-device/inter-system communications by reducing or eliminating the need for TSMs and other intermediaries; allows many service providers, including a variety of banks or other transaction service providers, to leverage existing platforms or infrastructure, and opens new possibilities for expanded services and efficiencies.

The tokenization system 100 allows for the provision and unified control of a number of secure applications within a single wallet or other control application. This aspect of the tokenization system 100 can be use where, for example, a number of similar, or otherwise corresponding, applications, are provided on, or through, a single user device 102, 202, etc. For example, in the context of financial transactions, a single 'wallet' application can provide access to data and instructions adapted for use and control of transactions using accounts held and/or otherwise administered by a number of independent, financial institutions. For example, a user having accounts with multiple banks and/or payment accounts held by different institutions can use various aspects of the invention to commonly and/or selectively store, access, and control the various accounts. This aspect of the tokenization system 100 allow a first institution, such as a bank or credit card company, that provides access to such a wallet or other application, to be able to make memory and processing capacity available to other, non-affiliated institutions, and derive revenue thereby.

When, for example, a user of a device 102, 202, etc., wishes to access a wallet or ether application, the application may be accessed in the corresponding IP location in the cloud, and desired or required information can be pulled by the device 102, 202 from its cloud-based storage location for use in POS or other transaction communications.

As will be understood by those skilled in the relevant arts, any communications, payment, and/or other protocols suitable for use in implementing the various aspects of the invention may be used. These include, for example, GSM, EMV-GP (Europay-MasterCard-VISA Global Platform), and other protocols. Global Platform is a platform/organization that has provided standards used to manage applications (e.g., Java Card Applets) on cards. It includes authentication schemes and authorization of additional "security domains", that may manage applications, EMV is a standard created by Europay, MasterCard; and VISA for interoperability of smart cards, including SEs stored on SIM cards, etc., and POS (point of sale) terminals.

A secure element (SE) can, for example, comprise encrypted hardware (e.g., a suitably-configured SIM card), public/private keys and other cryptographic elements, and suitable communications-devices for communication through, for example, a controller of a device 102, 202, with an NFC or other communications system of the device 102 and thereby with merchant POS systems 114, servers 112, etc.

Trusted Platform

Figure 13:
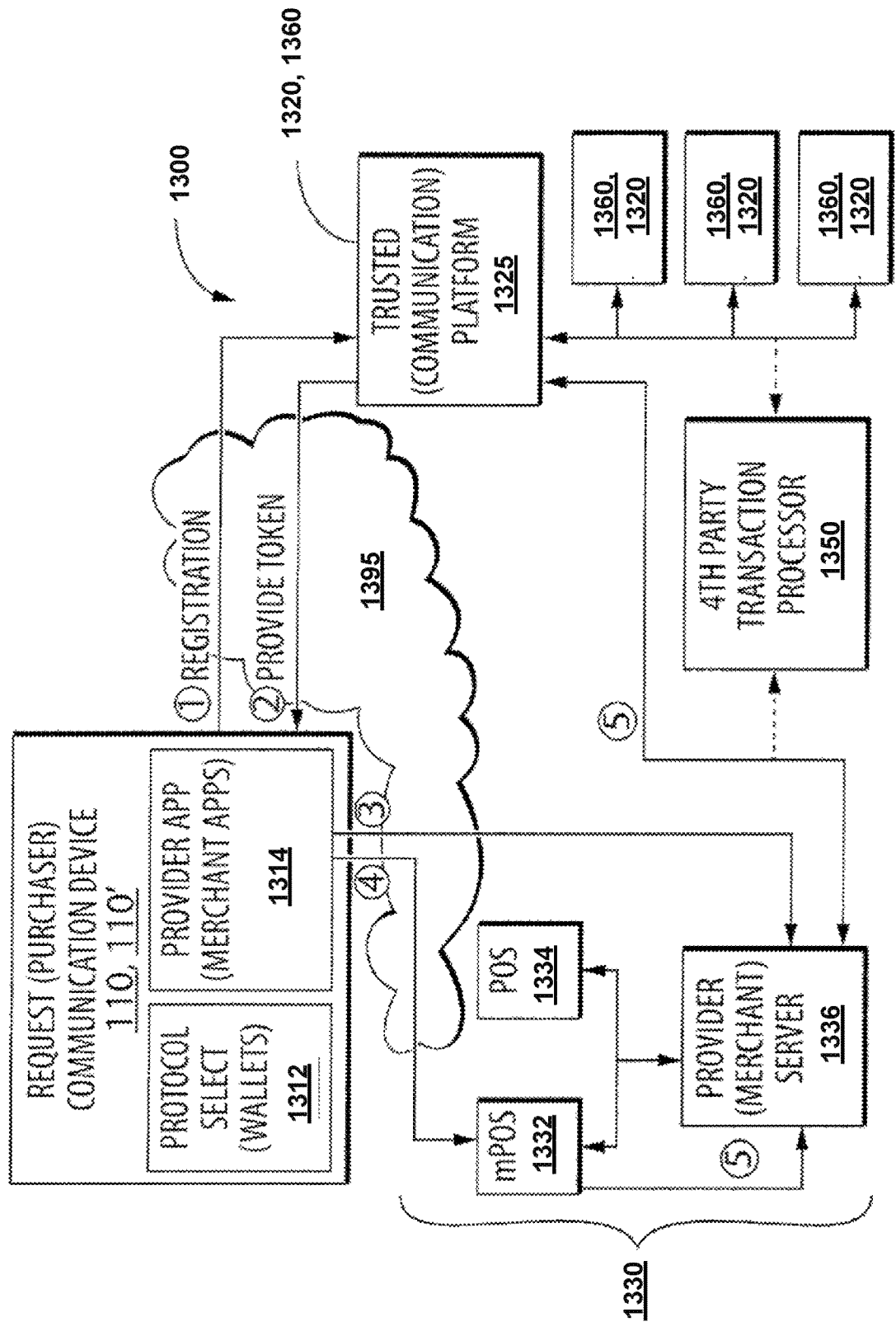
FIG. 13 shows a schematic diagram of a system suitable for use in implementing various aspects and embodiments described herein.

FIG. 13 shows a schematic diagram of a system 1300 suitable for use in implementing various aspects and embodiments described herein. In the example shown, a system 1300 includes at least a user or request communication device 1310 (also a "network transaction communication device" and/or a "network communication device"), for use by purchasers or other users 1390; a trusted authentication platform (also a 'trusted platform' or 'transaction processing system') 1320; and a merchant system 1330 comprising merchant point of sale (POS) and/or other transaction device(s) 1332, 1334, and merchant or other financial services provider (FSP) server 1336.

While only one of each of devices 1310, 1320, 1330, 1332, 1334, 1336 is shown in FIG. 13, those skilled in the relevant arts will readily understand that a system 1300 can include any desired or otherwise advantageous numbers of such devices.

In various embodiments, user or request communication device(s) 1310 may comprise or consist of any suitably-configured smart phone, tablet, wearable, laptop, or other mobile devices; desktop or other stationary computer(s) or terminals, etc. A large number and variety of suitable devices are now available commercially, and doubtless others will be developed subsequent to the preparation of this specification. In some embodiments, user or request communication device(s) 1310 may comprise Internet of Things (IoT) devices, including vehicles.

Trusted platform(s) and other transaction processing system(s) 1320, 1320' may comprise or consist of any enterprise, server, desktop, laptop, or other suitably-configured types or class(es) of electronic data processing (computer) systems. A large number and variety of suitable devices are now available commercially, and doubtless others will be developed subsequent to the preparation of this specification.

Merchant system(s) 1330 and device(s) 1332, 1334, 1336 may comprise or consist of any suitably-configured POS, mPOS, and backend data processing devices. A large number and variety of suitable devices are now available commercially, and doubtless others will be developed subsequent to the preparation of this specification.

Devices 1310, 1320, 1330, 1332, 1334, 1336, or any of them, may communicate between themselves by wireless (including radio, wireless telephone, optical, RFID, and infrared), wireline, or other means, using for example suitably-configured signal processors, transmitters, and receivers configured to communicate via the internet, the PSTN, and/or other communications networks, using any suitable protocols or combinations of protocols. Very commonly, such devices incorporated one or more dedicated communication subsystems, operating under the control of one or more central processing units (CPUs) and/or other processors, for such purposes.

As a part of implementing the processes enabled herein, as shown at (1) in FIG. 13, a user 1390's device 1310 may be registered with a trusted platform server 1320 by means of suitably-configured signal exchanges over a communications network 1395 (e.g., the Internet and/or PSTN), and at (2) be provided by the trusted platform 1320 with a secure data set, representing a certificate or other token, to be stored in volatile or non-volatile (i.e., transitory or non-transitory) memory of the device 1310 and thereby make the device 1310 a trusted device 1310'. Once received and stored in device 1310, such certificate or token may be used by the device 1310 and trusted platform 1320 for rapidly and securely identifying the device 1310 as a "trusted device" 1310', for example for transmission to and interpretation by the trusted platform 1320, for use in rapidly authorizing and/or otherwise verifying data processes such as purchases or other financial transactions with third parties such as one or more merchant systems 1330.

Registration of a device 1310 with a trusted platform 1320 to create a trusted device 1310' can comprise any means of establishing means for suitably unambiguous and secure communications that are consistent with the purposes herein. For example, one or more unique and secure identifiers of the device 1310, and/or one or more authorized or associated users 1390 thereof, may be used, in a wide variety of alternatives and combinations. These can include for example, names, 'secret' personal information, serial numbers, random or pseudo-random codes, account numbers, etc.

Such a trusted device 1310' may then, for example at (3), be used to authenticate a user and/or negotiate and complete one or more 'in-app' payments or other data processing transactions through a direct Internet connection such as a merchant, game, or other application ('app') provided by a merchant/provider 1330 or some other entity, including general purpose web (i.e., network) browsers and the like, using suitably configured hypertext links, provided to a user display screen or other I/O component of the trusted device 1310', and transfer of touchscreen, keyboard/keypad and/or other user-generated inputs, signal transmitters and receivers, etc.

In the same and other embodiments, at (4) a trusted device 1310' may communicate locally with a mobile POS ("mPOS") device 1332 logically bound to a merchant system 1330, 1336, which itself may be registered with the trusted platform 1320 as a trusted entity, for what is sometimes called direct, or "off the rails" of the conventional payments systems, processing. In other words, the mPOS 1332 and/or bound merchant processor 1336 may be enabled by such means to communicate, as shown at (5), directly with the same or another trusted platform 1320 without having to negotiate, by means of suitable signal exchanges, with a fourth-party transaction processor 1350 such as a payment processor such as VisaNet or equivalent proprietary payment network. By obviating the necessity of involving fourth parties 1350 such as payment processors for "on the rails" processing by more conventional may include faster and more secure processing of often sensitive transaction data such as identities, account identifiers, etc.

In some embodiments, such an mPOS 1332 and/or other bound merchant processor 1336 may be enabled to also and/or alternatively communicate, instead of directly with a platform 1320, by means of suitable signal exchanges, with such fourth-party transaction processor 1350, which as noted could be a payment processor such as VisaNet or other proprietary payment network. Transactions negotiated between an mPOS 1332 and/or bound merchant processor 1336 and a fourth party transaction processor 1350 may then be settled subsequently with an issuer bank 1360 and/or with a trusted platform 1320 so that a merchant is paid and a user is debited a corresponding amount regardless of the account(s) or other sources of funds or the protocol(s) or type(s) used in presenting payment to the merchant. One possible advantage of such configuration is that an mPOS 1332 and/or bound merchant processor 1336 may be already configured for communication and/or transaction processing with a fourth party processor 1350. Thus, any and all benefits of authentication with a trusted platform 1320 may be realized in mobile transactions, while taking advantage of existing merchant system architectures.

In addition to payments and other financial transactions, trusted platform architectures 1300 may be used for a variety of other purposes. For example, as noted above, identity verification is another possible application (e.g., the bank trusts me, you trust the bank, so you, arbitrary third party, trust me). Trust between banks or other account administrators or trustees 1360 associated with a trusted platform 1320 may work in a similar manner. Each bank or FSP 1360 may be validated and verified with the other banks or FSPs 1360 in the trusted platform system 1300.

In various embodiments, a trusted platform 1320 may be used to enable users of devices 1310' to consummate purchases and/or process other transactions based on personal, device, or other non-payment identity(ies) or identifier(s) associated with one or more accounts to be used to effect payment, rather than account numbers and the like. Data representing a user's true identity, or other identity acceptable to a trusted platform 1320 as a guarantee of completion of payment or other obligation(s) associated with a transaction, such as an employer's or other associated institution's identity, may be received, validated, and verified through an onboarding process or other process, and maintained at one or more servers 1320 in the trusted platform architecture 1300; and one or more suitable tokens, comprising data representing authenticating identifier(s), may be returned to the user device 1310 for storage in memory associated with the device 1330, so that it may be thereafter be used to return to the issuing trusted platform 1320 data (which may be or include the token) suitable for use in establishing and/or re-establishing the device 1310 as a trusted device 1310'.

As will be appreciated by those skilled in the relevant arts, any user or request device 130 may be associated with multiple authorized human and/or juristic users, and/or with multiple accounts associated with such user(s). For example, each such device may be used by different authorized users and/or entities in different jurisdictions, or in different data processing contexts, as for example different social media platforms vs inside a brick-and-mortar merchant premises or particular online services (e.g., an online music or media source). A representation of, link to, and/or other data or instruction associated with each validated identity may be stored on or in an ID card, such as a physical credit or debit card, or in separate or general memory of a device 1310, 1310', such as an SD card or other removable device, or in general memory or memory otherwise associated with or accessible by such a device, as for example in one or more virtual wallet application(s) 1312, dedicated software, firmware, or hardware, or a separate device of similar functionality, such as a USB key. A card or device 1310, 1310' comprising such trusted identifier(s) can be tapped to or otherwise caused to interact with a POS device 1332, 1334, or another mobile device 1310, 1310', etc.; and at any suitable point in the process any one of the multiple identifiers may be selected for use in connection with a transaction, using for example suitably-configured I/O devices of the device 1310, 1310'. Identifier(s) associated with the selected identity may be forwarded by the POS/device 1310, 1310' to a server 1320 which will verify that the ID is trusted for completion of the transaction.

In embodiments adapted for completion of purchases and other transactions involving payments, one or more forms of payment to be used in completing a transaction can be agreed upon in advance, at the time of a transaction, and/or after the transaction has been confirmed, between the user 1310' and the merchant system 1330, and communicated to the bank/trusted platform/transaction processor 1320, 1360, for example, by the POS 1332, 1334, or server 1336, etc. Such methods of payment may be registered with or otherwise authenticated by the bank 1360 or other trusted platform 1320, so that the need for transmitting and interpreting information identifying such methods may be obviated or otherwise reduced. In this manner, for example, payment may be completed with use of an instruction to the bank 1360 or other trusted platform 1320 to process payment according to the agreed upon method of payment, without having to provide any details (which may be of a sensitive nature) related to the selected source or method of payment in the payment message itself. In some embodiments, the authentication of the user may be provided by a location of a trusted device, including for example, a proximity of the trusted device to another user device or to a POS.

Thus, for example, a variety of types or modes of payment settlement processing are enabled. For example, at the time of a transaction, both the user of a device 1310' and the merchant system 1330 may agree on a type, mode, or protocol of payment protocol to use (e.g. credit, debit, cash bank transfer, loyalty point redemption, including one or more specific accounts associated with each such type of payment), and identifier(s) associated with the selected protocol can be transmitted to the trusted platform server 1320. Such protocol may be agreed and designated for use in processing, irrespective of the type(s) of payment accounts to be used in completing the transaction. The server 1320 can itself have the ability to process the payment with the selected protocol, particularly where the server 1320 is associated with a bank or other account-controlling FSP 1360. From the perspective of the merchant 1330, the transaction data flow can be the same, or essentially the same, regardless of the payment protocol selected, in accordance with the preferences of itself or its payment systems service providers.

A trusted platform 1320 may communicate with any one or more merchant systems 1330 and/or FSPs 1360, or act as a bank or FSP in its own right in completing a transaction, and complete such transaction using any one or more of a wide variety of payment types or protocols, without any requirement for differences in processing by merchant system(s) 1330.

Optionally, or in addition, a trusted platform 1320 may associate a default account, or other payment protocol or method, with transaction requests generated by a user device 1310' associated with specific transaction requests (or in some embodiments associated with a location of a trusted device of the user), based on a variety of criteria, including for example user identity, account characteristics (including the identity of any FIs associated with the account(s)), and/or user preference(s).

Any or all of the above options may be controlled and/or otherwise implemented by a trusted payment application operating on a user device 1310'. For example, a virtual wallet application 1312 may be associated with a specific user identity, as for example an individual, one or more of the individual's accounts, one or more distinct FIs or FSPs, and/or one or more user/merchant application combinations; and a specific authorized user of a device 1310' may be enabled, for example by means of suitably-configured user interfaces, to select which identity/app/account or combination thereof is to be used to conduct transaction(s); and any one or more of such selections may be identified as overridable or non-overridable default selections under desired conditions. Such pre-selection by means of defaults can, for example, eliminate the need for a user to select, and a trusted platform 1320 and/or merchant 1330 to accept, a specific payment method at the time of a transaction.

Optionally, a trusted platform 1320 acting as or on behalf of an FSP 1360 may offer to the user, either through the user's device 1310, 1310' and/or through an mPOS 1332/POS 134, opportunity(ies) to open or otherwise access or create a new or existing line of credit or other new funding source at the time of payment, through the use of suitably-configured user interfaces and data exchanges. A wide variety of further possibilities are enabled by the invention, including the creation of loyalty, reward, gift, and other types of accounts.

As will be appreciated by those skilled in the relevant arts, a trusted platform 1320 can be used to assure a merchant associated with a merchant system 1330 (which may for example be operated by or on behalf of an association of merchants) that the merchant will be paid an amount owing to the merchant as a result of a transaction in accordance with the disclosure, regardless of the source(s) of funds used to pay for the transaction. From the merchant's perspective, where the money comes from on the user's side is generally not important, so long as the merchant is paid. This is a further significant advantage offered by the invention. For example, a user of a device 1310' can be enabled to pay with any method acceptable to the trusted platform 1320 and/or an associated FSP 1360, without having to consider the merchant's preferences for payment. For example, in many prior art systems, when a merchant does not accept a specific form of payment then the user is required to find another, acceptable method of payment. A trusted platform 1320 can, for example, be adapted to accept and make payments in accordance with such preferred protocol(s), and to cause payment to be transferred to the merchant in accordance therewith, and subsequent settlement between the trusted platform 1320 and the purchaser using the device 1310' to take place according to any desired, mutually acceptable form of payment. This can, for example, be accomplished by advancing payment to the merchant system 1330 from funds controlled by the trusted platform 120 itself in the credit card or any other desired protocol, and collecting reimbursement from the paying user separately. Without authenticating the merchant system 1330 as a trusted entity, settlement by the trusted platform 1320 first with the merchant and then separately with the user may be more difficult or not even possible at all.

In further embodiments, including those in which a trusted platform 1320 settles with the purchasing user separately from the merchant, a trusted platform 1320 or other FSP 1360 may provide for payment using a combination of funding sources associated with one or more users or device(s) 1310', without identifying the designated the sources to merchant system 1330. For example, a user can pay for half of a transaction with one credit card account, and the other half using a debit or loyalty account.

In various embodiments, a trusted platform 1320 or other FSP 1360 may allow for a user of a device 1310' to wholly or partially pay for a transaction using loyalty points registered with the trusted platform 1320, 1360, whether or not the merchant would otherwise be willing to receive points as a form of payment. This is possible in any circumstance where the points may be redeemed by or upon authorization of the trusted platform, 1320, 1360, without necessity for considering the preferences or requirements of the merchant system 1330. Thus, the trusted platform 1320, 1360 is enabled to pay the merchant in the merchant's preferred format (including choice of currency, such as dollars, euros, pounds, roubles, or yen, or electronic currency such as bitcoin) using suitably-configured signals and data exchanges. For example, a trusted platform 1320, 1360 can provide to a merchant system 1330 signals representing payment of $50 when the user of the device 1310' has settled, or has agreed to settle, with the trusted platform/FSP 1360 for $25 plus points associated with or otherwise acknowledged by the FSP, in an amount sufficient to compensate the remaining $25, either before or after settlement. The merchant system will only see that it received $50.

When a user taps the user's mobile or other transaction communication device 1310', or otherwise puts the device 1310' into an operating state configured for payment to complete a transaction, the trusted platform 1320 may directly communicate with the mobile device 1310' to determine payment options. Real-time offers, including coupon, redemption, discount, credit, and other options may be presented to the user, optionally in conjunction with opportunities to pay by various methods, including for example new credit, loyalty, or other accounts. Again, a wide variety of such options and communications can be handled through a virtual wallet or other payment app 1312, 1314. In some embodiments, a trusted device's location may authenticate a user and/or initiate payment without the need for a mobile device.

Among the many advantages offered by the trusted data processing relationships that may be established between devices in accordance with the invention, particularly where a trusted platform 1320 is operated by or on behalf of a bank or other FSP 1360, is the ability to enable a user of a device 1310' to change a selected method of payment following completion of the transaction, and even after the merchant system 1330 has received and processed final payment data from the trusted platform/FSP 1320, 1360. Since the merchant is paid by the trusted platform/FSP 1320, 1360 regardless, the trusted platform/FSP (the bank) may allow the user, through the user's trusted device 1310', to select new or revised form(s) of payment, optionally within a specified time limit (e.g. during the same business day, within 24 hours or a standard transaction clearance period, or within some other predefined cutoff). In such embodiments the trusted platform/FSP 1320, 1360 may be configured to send a reminder to the trusted device 1310' regarding the pending expiry of the time limit to change the method of payment. Before this cutoff time, the trusted platform 1320, 1360 can settle with the merchant system 1330, regardless of payment status as between the trusted platform/FSP 1320, 1360 and the user of the device 1310'.

Among the advantages offered by various embodiments of the invention is that, at the time of payment, a trusted request communication device 1310' may not require a network connection with the trusted platform 1320 and/or FSP 1360, because the trusted device 1310' is configured (see e.g., (1) in FIG. 13) with a token which, among other possibilities, may be forwarded via the merchant system 1330, including for example an mPOS 1332, to the trusted platform 1320 for payment and/or other settlement, without need for communication between the device 1310' and platform 1320 at the time of the transaction.

A trusted platform 1320 also may facilitate payments between parties without a merchant mPOS 1332, including for example between pairs or other multiples of user communication devices 1310'. For example, a pair of parties may each have a mobile device 1310 registered as a trusted device 1310' with a trusted platform 1320. As long as the trusted platform 1320 has established a trusted data interchange relationship with each party's device 1310', the trusted platform 1320 will trust commands received from each device 1310'. Instant money transfers between parties may therefore be possible since the trusted platform 1320 trusts both parties individually, especially where both parties are customers of the same bank 1360.

A trusted platform 1320 may also facilitate the transfer of tokens representing pre-authorized transaction values (e.g., pre-paid value) between user devices 1310'. Where network communications are available, this can be handled using processes described above. Where network communications are not available, it may for example be accomplished by associating such a prepaid token with trusted identifiers associated uniquely with each of the transferring and receiving devices 1310'. Where necessary, transfer may be confirmed when network communications are restored. Alternatively a payment token can be deleted from the first device 1310', and a new but financially equivalent one be generated on, by, or for the recipient device 1310'.

Figure 14:
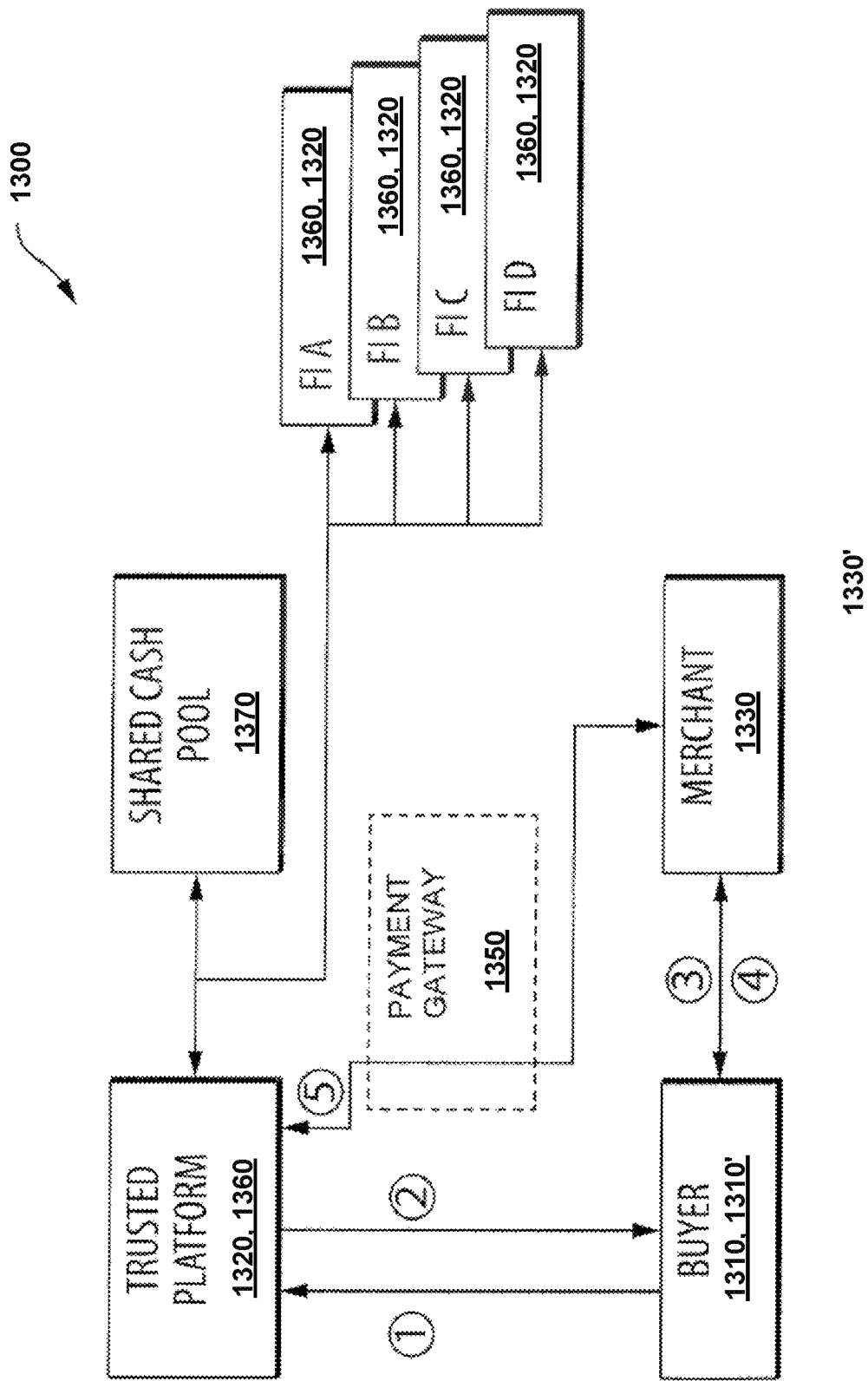
FIG. 14 shows a schematic diagram of an embodiment of a system, in accordance with some embodiments.

In FIG. 14, there is shown a schematic diagram of an embodiment of a system 1300, in accordance with some embodiments. Among variations shown in FIG. 14 is a "stored cash" or "shared cash" pool 1370, in the form of a secure data set 1325 (see FIG. 13) stored in memory controlled by one or more trusted platforms 1320. Such a secure data set 1325 can represent a pool of monetary value, in the form of data representing any desired form of real or virtual currency(ies) or value(s), or indicia thereof, which can be contributed to, and drawn from, by, for example, a plurality of trusted FSPs 1320, 1360 such as shown in FIG. 13, for use in the secure and potentially very fast clearance of transactions conducted between parties 1310, 1330 holding accounts at the various trusted FSPs 1320, 1360. As those skilled in the relevant arts will appreciate, once they have been made familiar with this disclosure, FSPs 1320, 1360 can be, include, or otherwise be administered by or associated with any of a wide variety of entities, including banks and other financial institutions.

Split Pay

Figure 17:
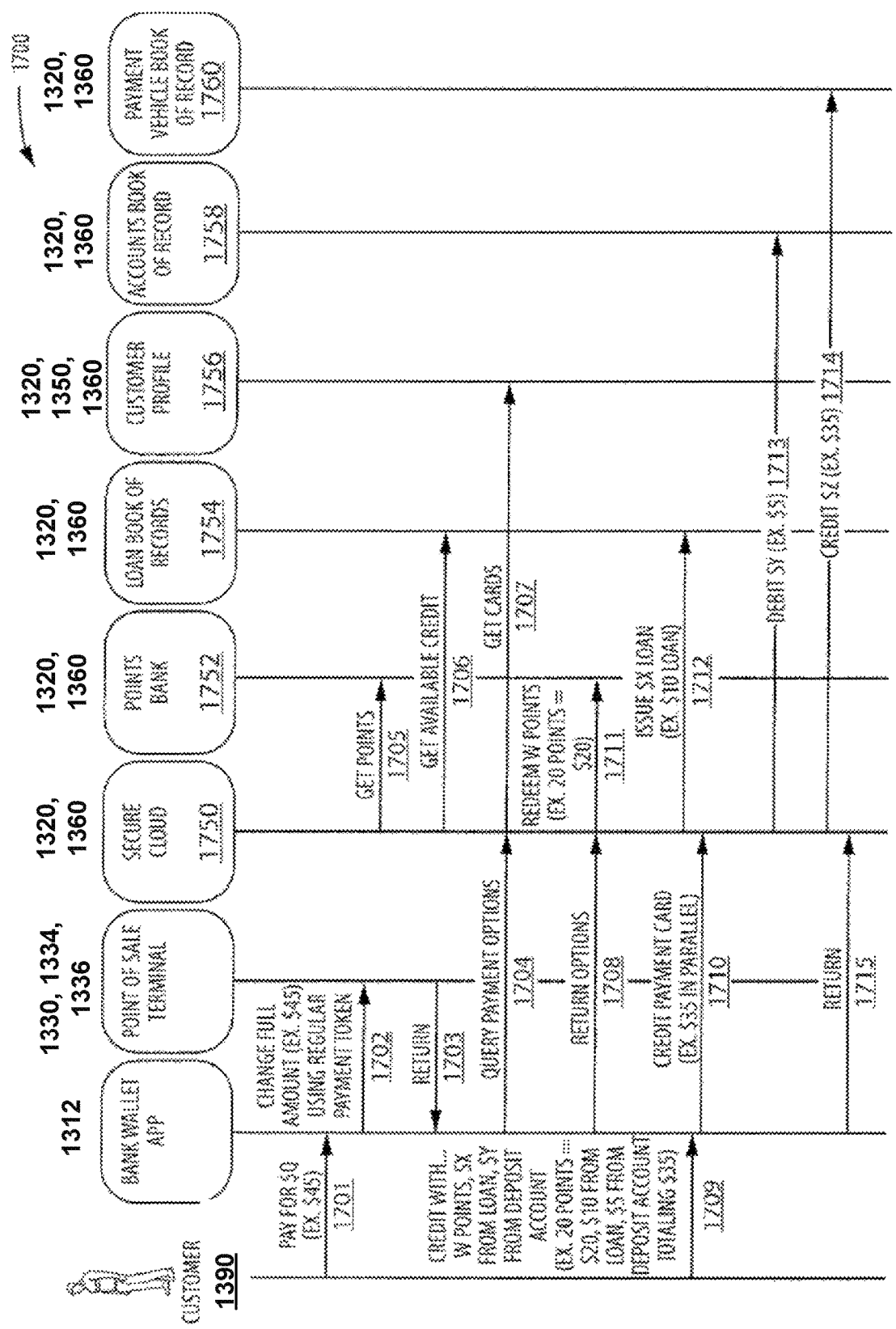
FIG. 17 shows a representative set of signal exchanges between components of system adapted for implementation of a split pay, real-time credit process, in accordance with some embodiments.

FIG. 17 shows a representative set of signal exchanges between components 1310, 1310', 120, 130, 150, 160 of system 1300 adapted for implementation of a split pay, real-time credit process 1700, in accordance with some embodiments.

In the embodiment shown, process 1700 enables payment by a user 1390 of a device 1310, 1310' for a transaction using one or more interim funding sources (sometimes referred to as "payment vehicle(s)"), and ultimate settlement using one or more of the same or other funding sources, through the use of his/her virtual wallet application 1312. The interim funding can be used, for example, to satisfy a merchant or vendor in real time at the time of sale, while settlement funding between the purchaser and his or her bank(s) or other FI(s) can occur at the same time or at any desired subsequent time. For example, interim payment can be charged to a one-time or persistent charge account, with settlement being made later out of one or more debit, credit, and/or points accounts, etc.

Process 1700 of FIG. 17 can be considered to begin at 1701 when a user 1390, who has for example been shopping in a brick-and-mortar store, approaches a merchant POS terminal 1330, 1334 with a mobile network transaction communication device 1310, 1310' and one or more items the user wishes to purchase. The user 1390 can, for example, access a virtual wallet application 1312 installed on or otherwise accessible by the device 1310, 1310' as described above, and, as described above, use input/output devices and GUIs of the device 1310, 1310' to negotiate a purchase with the merchant POS system 1334 and/or merchant system 1330, the negotiation culminating in the identification of one or more items and price(s) to be paid, and a total transaction purchase price. When the user 1390 is satisfied and ready to pay, the user can select an interactive GUI device "check out" or "ready to pay" displayed on a device screen and thereby cause the device 1310' to generate and route to the virtual wallet application 1312 a transaction execution command authorizing payment to the merchant system 1330, via the wallet application, of funds sufficient to satisfy a transaction amount payable to the merchant. In the example shown, the user 1390 has authorized payment of $45 for goods and/or services provided by a merchant via POS device 1336, 1336.

At 1702, the wallet application 1312 can generate and route to the POS terminal 1334, 1336 a merchant transaction payment authorization data set, or other transaction payment command comprising a prepaid payment token or instructions to charge the amount to an interim payment funding source (or "payment vehicle") usable by the merchant system 1330 for presentation to an FI 1320, 1360 for payment in full satisfaction of the transaction. Such token can represent authorization to charge the amount against one or more credit, debit, credit, points, or other funds sources, as described herein. At this point the merchant system 1334, 1336, 1330 can, at 1703, generate and route to the user's transaction communication device 1310, 1310' a transaction confirmation data set, issue a paper receipt, or provide other acknowledgement of completion of the transaction, and release the user 1390 to leave the premises with the goods/services, etc.

At 1704, the user's wallet application 1312 can begin a process 1704-1708 of polling all payment options associated with the user 1390, transaction communication device 1310, 1310', etc., and available for application to satisfy payment for the transaction, and returning to the user's device 1310, 1310' a payment options data set listing or otherwise representing the available options. As described above, for example, such a listing can comprise identifiers associated with available accounts and the value of funds or fund equivalents (e.g., rewards points value) available for application to the purchase.

For example, at 1704 the user's wallet application 1312 can generate a transaction payment funding source query data set, comprising signals representing instructions to an issuing bank or other FI or FSP 1750, 1320, 1360, associated with the user's wallet 1312 to poll all FIs associated with accounts available to the user 1390 and/or device 1310, 1310', as described above; and can route the query to the transaction processing system 1750 associated with such FI or FSP. In the example shown, the associated FI or FSP's transaction processing system 1750 is labelled "Secure Cloud."

At 1705, the FI 1750 associated with the user's wallet application 1312 can access a device or user profile data set associated with the inquiring user 1390 and/or device 1310, 1310', to identify all potential funding sources available for application in satisfying settlement of the transaction executed at process 1701-1703. For example, as shown in FIG. 17, at 1705 the associated transaction processing system 1750 can route available points query data set(s) comprising signals interpretable by transaction processing system(s) 1320, 1360, 1752 "Points Bank" (s) as executable instructions to check to one or more transaction administering one or more customer loyalty, gift, or other cash-equivalent points accounts associated with the user 1390 and/or device 1310, 1310'; and can receive from such system(s) 1752 points available data set(s) comprising data representing a number of points and/or cash value available through such points system(s) for application to the executed transaction.

Similarly, at 1706 the associated transaction processing system 1750 can route to one or more transaction processing systems 1754, 1320 "Loan Book(s) of Record," which administer loan, line of credit, or other credit facilities or accounts associated with the user 1390 and/or device 1310, 1310', available credit queries comprising signals interpretable by the system(s) 1754 as executable instructions to check available credit balances; and can receive from such system(s) 1754 credit available data set(s) comprising data representing amount(s) of funds available through such credit facilities or accounts.

Similarly, at 1707 the associated transaction processing system 1750 can route to one or more transaction processing systems 1756, 1320 "Customer Profile(s)," which administer customer profile or other data sets comprising data representing identifiers associated with debit or on-demand cash accounts associated with the user 1390 and/or device 1310, 1310' and available for application as payment funding sources against the transaction 1701-1703 and interpretable by the system(s) 1756 as executable instructions to check value(s) of funds available for such purposes; and can receive from such system(s) 1756 funds available data set(s) comprising data representing amount(s) of funds available through such accounts. Such customer profiles 1756 can be stored on, or accessed by, any user device(s) 1310, 1310', and/or other transaction processor(s) 1320, 1360, 1350, 1330, etc., suitable for use in accomplishing the desired level(s) of availability and/or security.

Having polled all available potential funding sources, at 1708 the associated transaction processing system 1750 can use the received points available data set(s), credit available data set(s), and funds available data set(s) received at 1705, 1706, 1707, to generate a transaction payment funding source option data set, and return it to the requesting wallet application 1312.

Upon receipt, the requesting wallet application 1312 can cause the device 1310, 1310' to generate and display for the user 1390 a GUI comprising items representing payment options available to the user of the device 1310'.

At 1709, the user 1390 can use items of the GUI to designate one or more accounts or other transaction payment funding sources to use in settling with the transaction processor(s) 1750, 1320, 1360 that settled the transaction at 1701-1703, and thereby cause the wallet app 1312 to generate a transaction settlement data set or transaction authorization request data set comprising data representing at least a transaction amount payable in satisfaction of the transaction, the one or more desired transaction payment funding sources, and a portion of the transaction amount payable to the merchant to be funded using each of the plurality of transaction payment funding sources. For example, in the example shown in FIG. 17, the user uses input/output devices to generate instructions indicating that the user wishes to apply $10 from a loan account, $5 from a deposit account, and $20 in rewards points. The user can do so by, for example, using an interactive slider graphical device to determine how much of the funding is to be drawn from the debit or credit "card" account and how much from the rewards point balance.

At 1710, the user can select a "pay" item to cause the wallet app 1312 to route the transaction settlement data set or transaction authorization request data set to the transaction processing system 1750 associated with the wallet app 1312, and thereby cause the system 1750 to accumulate funds from the source(s) identified in the transaction settlement data set, in the amounts indicated by the user 1390, and apply them against the interim payment transferred at 1702-1703.

At 1711-1713, for example, the transaction processor 1750 can generate and route instructions for redemption of points (1711), issuance of a loan/credit charge (1712), and transfer of funds (1713), and at 1714 apply the accumulated funds against the charge of 1702-1703 by crediting the account 1760 from which the interim payment was drawn, thereby and thereby cause the payment funded using the interim payment funding source to be satisfied using the plurality of payment funding sources.

At 1715, the transaction processor 1715 can generate and route to the wallet app 1312 a transaction settlement confirmation data set, comprising any useful or otherwise desirable data concerning transaction and payment details.

As previously noted, and as will be appreciated by those skilled in the relevant arts, once they have been made familiar with this disclosure, in any of the embodiments disclosed herein, above and below, any or all of secure cloud system 1750, points bank system 1752, loan book of record system 1754, customer profile 1756, accounts book of record 1758, and payment vehicle book of record 1760 can be operated or administered by a single transaction processor 1320, 1360, or by multiple processors 1320, 1360.

Identity Recognition

Figure 15:
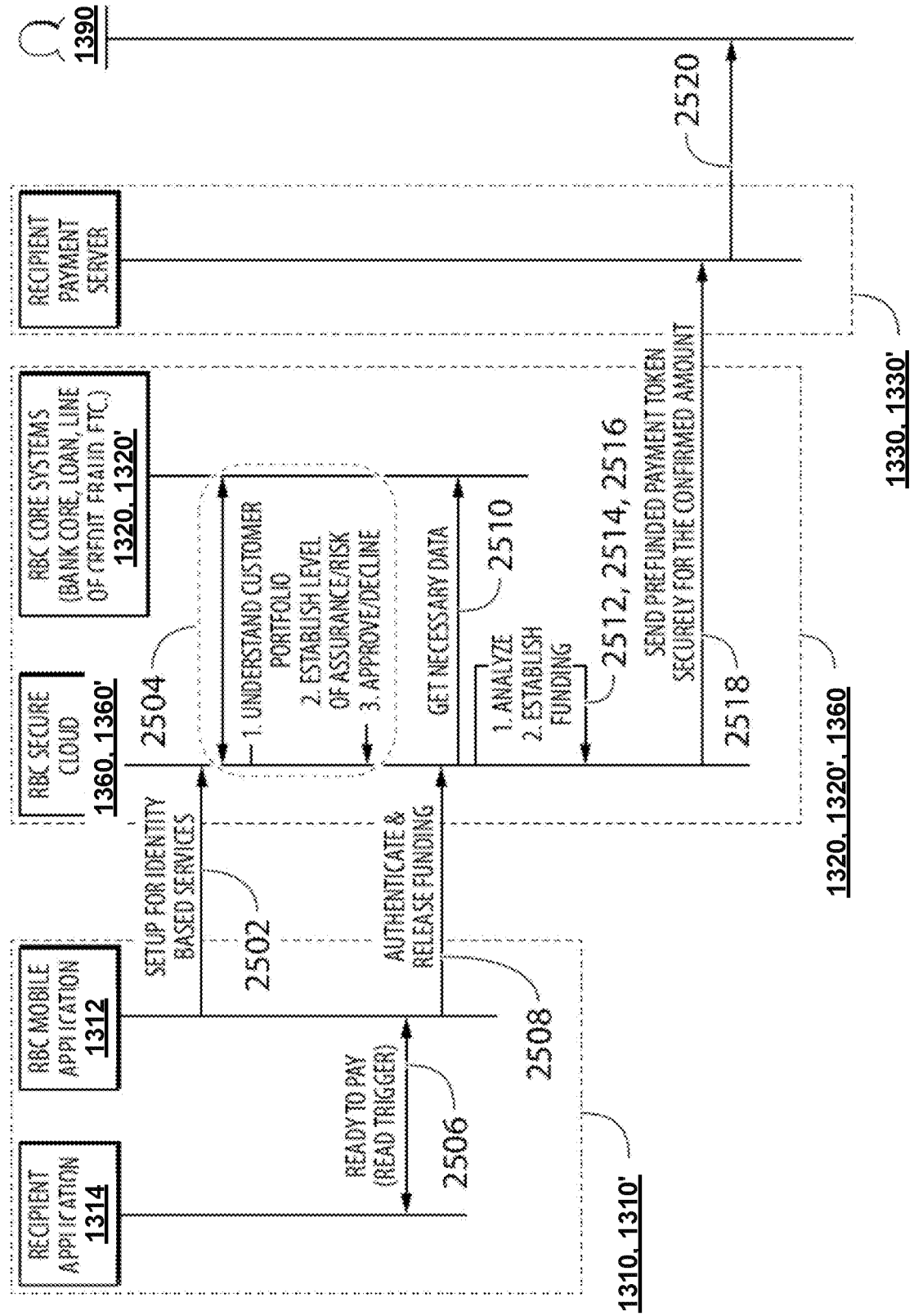
FIG. 15 is a schematic diagram showing representative signal exchanges between components of systems for secure processing of electronic payments, in accordance with some embodiments.

FIG. 15 is a schematic diagram showing representative signal exchanges between components of systems for secure processing of electronic payments 2500, in accordance with some embodiments. At 2502, for example, an authorized user 1390, 1390' of a transaction request device (also referred to as a transaction request processor or transaction controller) 1310, 1310', can invoke a virtual wallet application 1312 stored on the device and thereby establish a data communications session with an FI 1320, 1360 which controls or maintains access by the user to one or more accounts the user is authorized to use in satisfaction of payment transactions, or financial account administrator system 1320, 1360. Such a communications session can, for example, be initiated at any time, including well in advance of or at the time of any desired transactions.

Through the use of suitably-configured GUIs, the authorized user 1390, 1390' can be enabled to identify a plurality of accounts the user is authorized to rely upon for funds to be used in satisfaction of transactions, and can specify any desired preferences for funding of transaction payments using the accounts. As previously noted, such preferences can be of any type(s) suitable for implementing the purposes disclosed herein, including for example simple orderings or rankings of accounts to which the user has authorized access, to be applied inflexibly. Alternatively, the user can specify that the use of the preference ranking is to be conditioned upon criteria such as the availability of funds sufficient to satisfy a purchase price, etc., and/or can comprise more complex if/then or other logic to apply specific payment methods with specific vendors (merchants); and/or it can be conditioned on the availability or maintenance of specific threshold or minimum amounts in particular accounts, and/or maximum balances not to exceed on credit account(s). Alternatively, or in addition, the authorized account user can specify that the FI 1320, 1360 is authorized to select one or more accounts or funding sources associated with the user that the FI believes is most optimal or otherwise advantageous for its client for a given transaction, in view of the availability of advantageous interest rates, discounts, rewards, and points availability, etc. When the user 1390 has identified any/all desired preferences and/or criteria, at 2502 the user's application(s) 1312, 1314, etc., can generate a preference request data set and cause it to be routed to the financial account administrator system 1320, 1360. Such a preference request data set can for example comprise data such as:

<UID/S1/ . . . /SN/LC1/ . . . LCN/>
where:
  UID=one or more identifiers associated with the user 1390 authorized to access funds associated with any accounts identified in the request;
  S1 . . . . SN=identifiers associated with up to N funding source accounts, optionally in ascending or descending order of preference
  LC1 . . . . LCN=identifiers associated with up to N logical criteria to be applied by the financial account administrator system in identifying preferred funding source(s) to be applied toward satisfaction of transactions
  LC1 . . . . LCN can, for example, comprise identifiers associated with addresses or other references to information accessible by the financial account administration system 1320. 1360 and identifying or otherwise associated with any desired criteria, such as absolute or relative rankings, account balances, if/then statements, etc.

At 2504, the financial account administrator 1320, 1360 can invoke a process of confirming that the preference request data set received at 2502 is associated with one or more authorized account users 1390, 1390'; that the request complies with applicable laws and/or regulations; that the identified funding sources exist and are in good standing and adequately funded; can assess any risks to the requesting user, merchants, the FI 1320, 1360, etc.; and can approve or decline the request. Assuming the request is approved, a suitable payment account preference data set can be generated, stored in memory associated with the FI 1320, 1360, and/or routed back to one or more devices 1310, 1310' associated with the requesting user and/or accounts identified in the request for storage in, for example, secure memory associated with any suitably-configured applications 1312, 1314. As noted above, the payment account preference data set can be associated with a payment account preference identifier, which can for example be in the form of an EMV card number, or any other number or code suitable for use with one or more payment protocols, which identifier can be stored securely and/or routed back to the requesting device(s) 1310, 1310', etc., for use in immediate or future transaction processing as described herein. Such payment account preference identifiers can be used in transaction requests as dynamic card identifiers, or any other desired payment card identifier or token.

At 2506, an authorized user 1390, 1390' of a device 1310, 1310', can initiate a payment transaction by means of negotiations such as those described above using, for example, a virtual wallet application 1312 and/or merchant application 1314. Such negotiation(s) can, for example, involve interacting with a merchant system 1330 to negotiate the identification of one or more items or services to purchase, prices, etc.

When, for example, agreement has been reached and the user is ready to complete the transaction, at 2508 the user 1390, 1390' can use the application 1312, 1314 to generate a transaction request data set comprising a transaction identifier identifying a transaction to be satisfied by payment from one or more payment accounts according to a preference, including optionally an identity of a merchant or merchant system 1330, 1336 associated with the transaction; a transaction amount to be applied in satisfying the purchase; and payment account preference data such as a payment account preference identifier of the type described above; and can cause the transaction request data set to be routed to a financial account administrator system 1320, 1360, such as a bank or other FI associated with one or more of the user's accounts, or otherwise enabled to parse the transaction request and interpret the preference identifier.

At 2510 the designated financial account administration system 1320, 1360, can receive the transaction request data set generated by the transaction request device at 2508 and parse the data records contained therein to, for example, confirm the authenticity of the request and the authority of the requesting user 1390, 1390' to access any or all identified accounts by, for example, checking associated identifiers such as user names, passwords, biometric parameters, etc. against accounts administered by the FI 1320, 1360.

At 2512 the designated financial account administrator system 1320, 1360, can parse or analyze the preference data set received at 2510 to identify from a plurality of payment accounts or other funding sources associated with the payment account preference data one or more preferred transaction payment funding source accounts associated with funds to be applied toward satisfaction of the transaction amount. For example, the FI system 1320, 1360, 1390 can poll one or more accounts associated with the requesting user 1390, 1390' to determine whether they contain sufficient funds to comply with a preference scheme generated at 2502. Such accounts can comprise demand currency accounts 2530, such as debit accounts; loan accounts 2540 such as credit cards or other sources of loaned funds; line of credit accounts 2550 such as personal LOCs, home equity facilities, microloan facilities, etc.; and/or non-currency value accounts 2560 such as loyalty or rewards accounts that can be converted to currencies and used to satisfy the requested transaction in accordance with preferences associated with the preference data set.

Such polling can include communicating with one or more other financial account administrator systems 1320, 1360 to make such determinations where, for example, accounts on multiple banks/rewards processors are to be applied.

At 2514, using information gathered or confirmed at 2512, the FI 1320, 1360, can fund the transaction in accordance with the preference data set by applying any preferences or other criteria LC1 . . . . LCN and generating one or more transaction payment data sets, each transaction data payment set comprising data representing a negotiable payment token comprising data useable for identifying at least the same or another identifier associated with the transaction; at least one identified preferred transaction payment funding source account 2530, 2540, 2550, 2560, etc., and a payment amount to be applied from each identified preferred transaction payment account; the transaction payment data set being formatted according to the EMV or any other desired payment protocol, and routing the at least one transaction payment data set to at least one transaction payment processor 1336, 1336', via the data communications network. Where, for example, accounts 2530, 2540, 2550, 2560, etc. are administered or otherwise controlled by more than one FI 1320, 1360, 1390, the responding FI 1320, 1360, can, as described above, coordinate contributions from multiple funding sources using processes described above.

Optionally, when a funding level has been determined, at 2516 a previously-generated payment token can be retrieved from a secure data base 1321 and added to a transaction payment data set to be routed to a merchant or other payment recipient system 1336, 1336', etc. Alternatively, at 2516 a new payment token associated specifically with the requested transaction can be generated, and routed to the payment processor 1336, 1336'.

At 2518, the transaction payment data set can be received by the merchant or vendor system 1330, 1330', 1336, 1336' and applied to satisfy the transaction.

At 2520, the purchased goods or services can be delivered to the purchaser 1390, 1390'.

Figure 16:
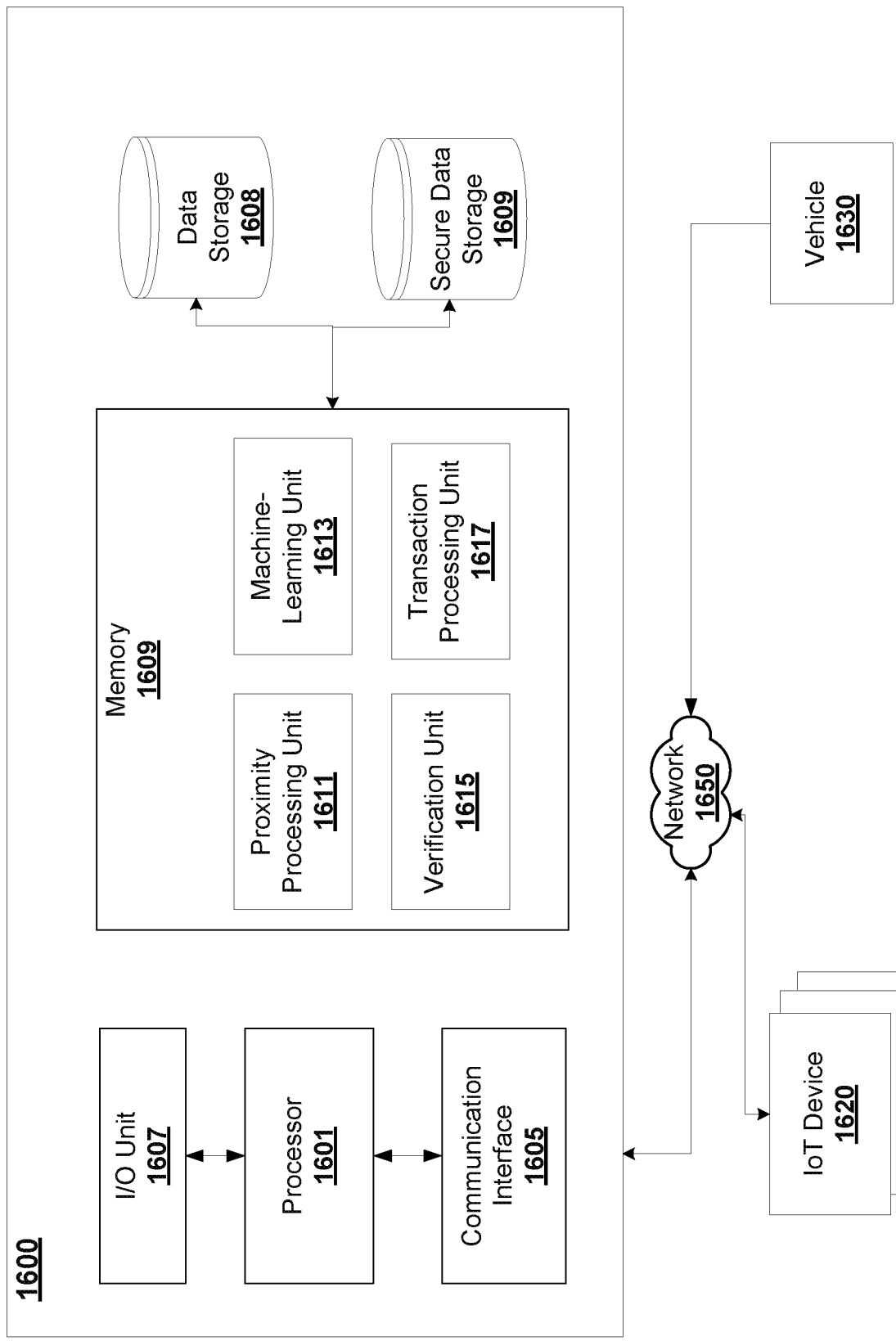
FIG. 16 is a schematic block diagram of a physical environment for a tokenization system 1600, in accordance with some embodiments.

FIG. 16 is a schematic block diagram of a physical environment for a tokenization system 1600, in accordance with some embodiments.

The computer system 1600 is used for authentication using secure tokens. System 1600 may be software (e.g., code segments compiled into machine code), hardware, embedded firmware, or a combination of software and hardware, according to various embodiments.

The secure tokens can be adapted for use by computing devices having limited computing resources (e.g., portable devices), such as computer memory, processing capabilities, and computer storage, which are then used to validate responses to challenges by third party devices to validate or verify one or more characteristics of the individual attesting to the challenge.

A processor or processing device 1601 can execute instructions in memory 1609 to configure various components or units 1611, 1613, 1615, 1617. A processing device 1601 can be, for example, microprocessors or microcontrollers, a digital signal processing (DSP) processor, an integrated circuit, a field programmable gate array (FPGA), a reconfigurable processor, or combinations thereof.

Each communication interface 1605 enables the system 1600 to communicate with other components, exchange data with other components, access and connect to network resources, serve applications, and perform other computing applications by connecting to a network (or multiple networks) capable of carrying data.

Each I/O unit 1607 enables the system 1600 to interconnect with one or more input devices, such as a keyboard, mouse, camera, touch screen and a microphone, or with one or more output devices such as a display screen and a speaker.

Data storage 1608 can be, for example, one or more NAND flash memory modules of suitable capacity, or may be one or more persistent computer storage devices, such as a hard disk drive, a solid-state drive, and the like. In some embodiments, data storage 1608 comprises a secure data warehouse configured to host user profile data.

Data storage 1608 can store, for example, reference databases of other facial frames for usage in encoder neural network (e.g., variational auto-encoder) selection of features for compression or supervised/unsupervised training, model data architecture parameters, weights, and filters (e.g., together representing various transfer functions), secure tokens, and user profile information for example.

Memory 1609 may include a suitable combination of computer memory.

A proximity processing unit 1611 may be configured to determine a proximity of an IoT device 1620 (including a vehicle 1630) to another user device or to a POS or merchant device.

A machine-learning unit 1613 may be configured to process one or more data sets representative of one or more locations or proximities for training one or more models for generating predictions regarding new locations or proximities.

There may be two machine learning units-a first unit adapted for extracting, for example, using an encoder neural network, the data sets into a data subset that represents a constrained set of features identifying an individual.

The extraction allows for an improved compression ratio to reduce an overall storage and/or downstream processing burden. The determination of which features to retain (even in a transformed state) can be conducted by a specially configured and trained encoder neural network.

A verification unit 1615 may be configured to receive processed locations and/or proximities from proximity processing unit 1611 and verify a user's identity based on a user profile stored in data storage 1608.

The secure tokens are generated by processors either at the portable computing device or at a computer server.

The secure tokens can be stored on the portable computing device for electronic presentment to a third party computing device, such as a verifier device (e.g., a gate entry device controlling access to a building or a computer). Upon authentication, in some embodiments, a computing function can be invoked, for example, a computing process that initiates a financial transaction.

A transaction processing unit 1617 may be configured to process a transaction following authentication of a user based on the proximity or location of a vehicle 1630 or other IoT device 1620 associated with the user.

Figure 18:
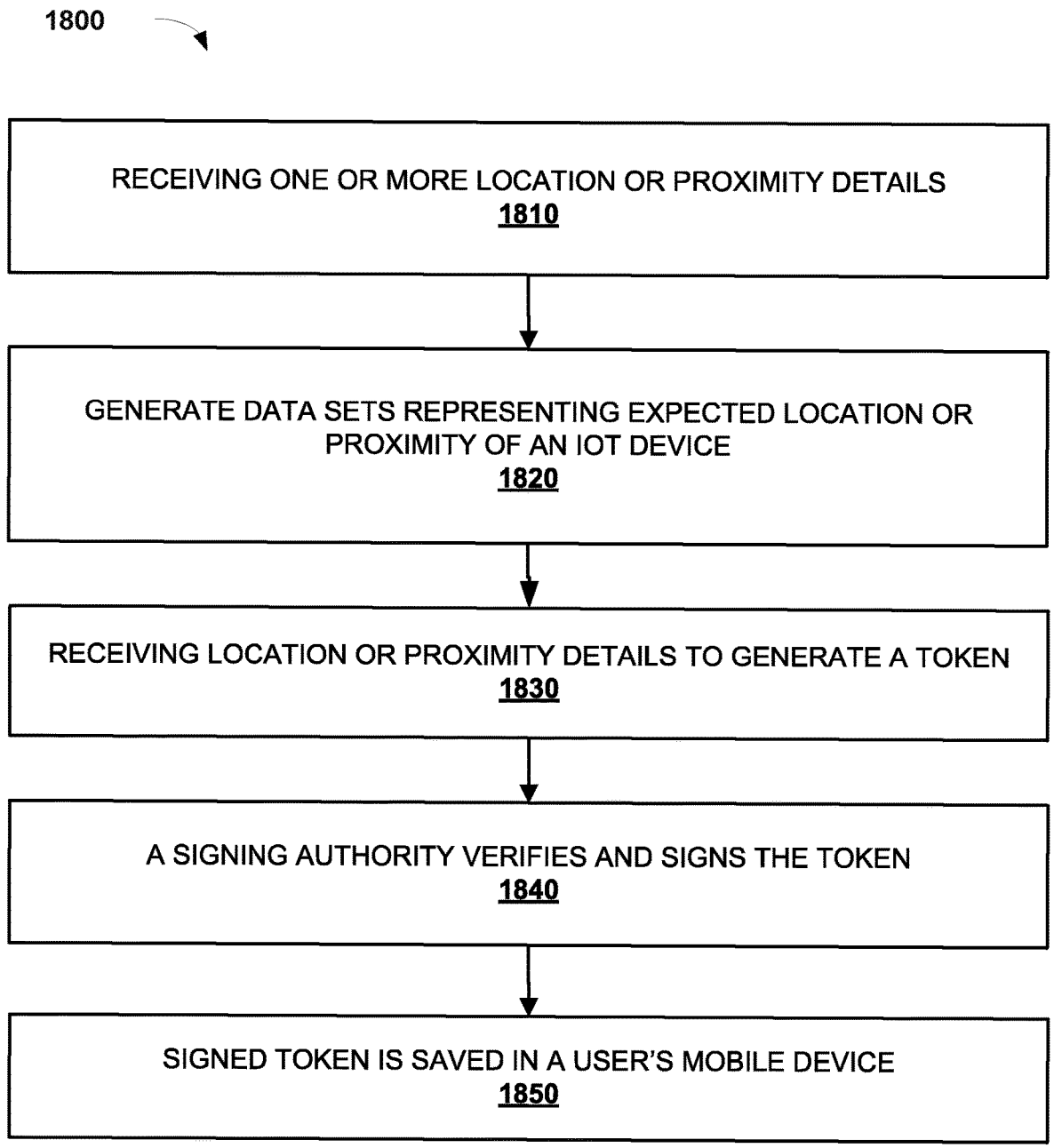
FIG. 18 shows a computer-implemented method for proximity processing, in accordance with some embodiments.

In some embodiments, a computer-implemented method 1800, show in FIG. 18, for proximity processing is disclosed herein. The method may be performed, at least in part, by a processor in a mobile device. The method may include: at 1810, receiving, by a first neural network, one or more location or proximity details of a user. The location or proximity details may be obtained by a GPS or via a Bluetooth, wifi or near field connection with another device or with a POS or merchant device. At 1820, processing the location or proximity details, by the first neural network, to generate data sets representing expected location or proximity of an IoT device associated with a user.

At step 1830, receiving, by a second neural network, the location or proximity details, and processing the location or proximity details, by the second neural network, to generate a token associated with the user.

At step 1840, a signing authority may verify identity of the user and sign the token with a signing algorithm, such as a public/private key pair.

At step 1850, the corresponding signed token is transmitted from the signing authority to the user's mobile device, subsequently saved in a token database on the mobile device.

In some embodiments, additional attributes can be contained in the signed token that is stored on the phone, to form an enhanced token.

Figure 19:
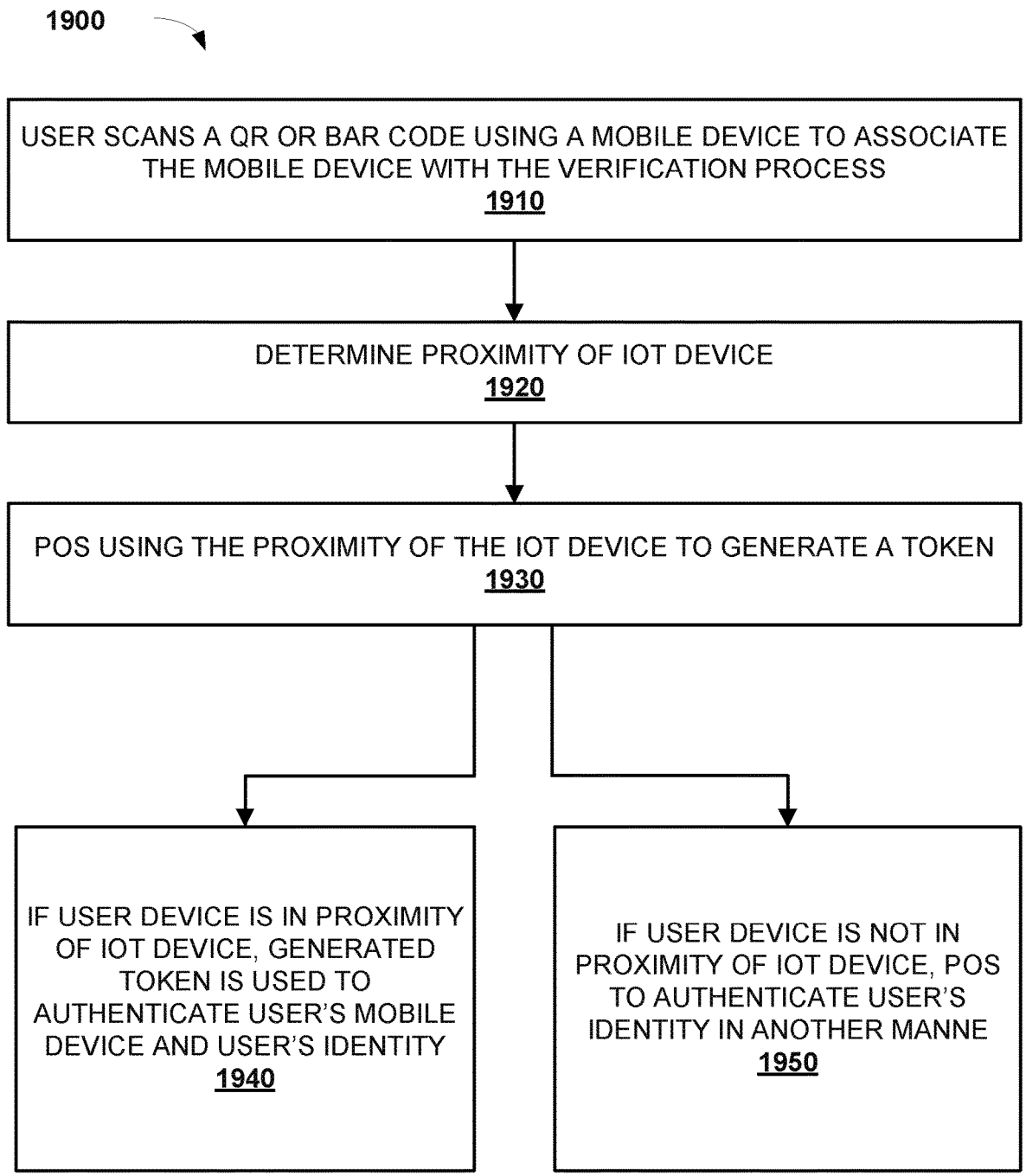
FIG. 19 illustrates a process for verifying a user at a Point-of-Sale (POS), in accordance with some embodiments.

Referring now to FIG. 19, a process 1900 for verifying a user at a Point-of-Sale (POS) is illustrated. At step 1910, a user can scan a QR or bar code using a mobile device to associate the mobile device with the verification process. At step 1920, vendor POS determine if a user's IoT device is in proximity.

At step 1930, POS can use the location or proximity details to generate an identity token of the user.

If a user's mobile device is with a proximity of the IoT device, at step 1940, generated identity token is used to authenticate the user's mobile device and user's identity.

At step 1950, if a user's mobile device is not in proximity of the IoT device, POS may authenticate user's identity in another manner.

IoT Tokenization

Figure 2:
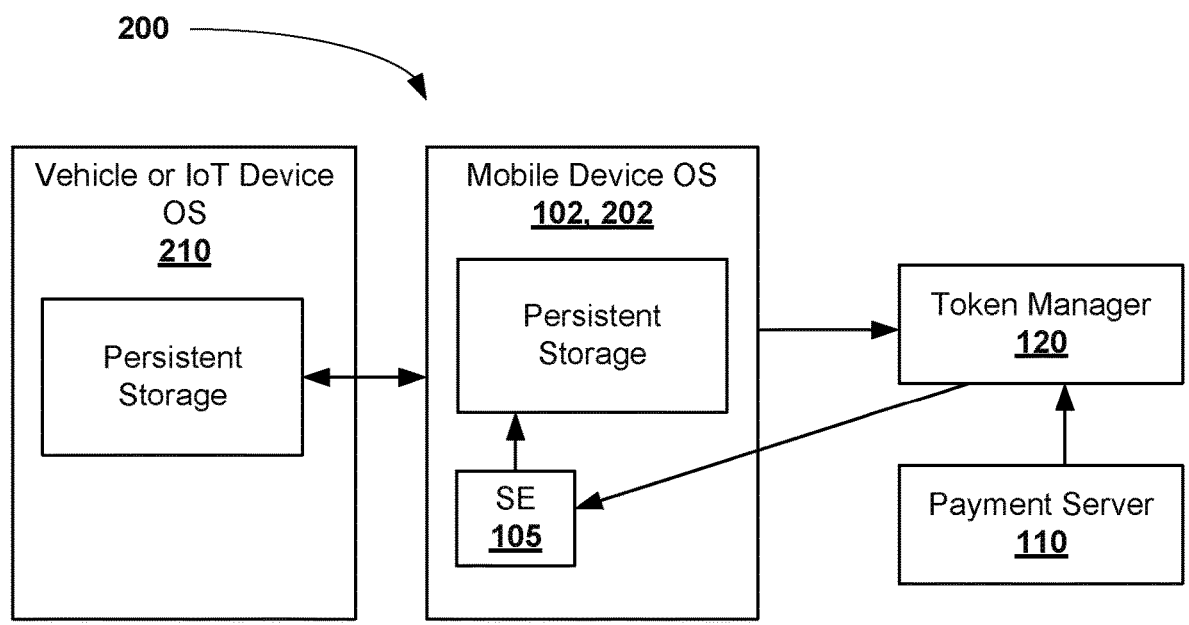
FIG. 2 illustrates, in a schematic diagram, an example of aspects of secure element and payment token provisioning and communications processes, in accordance with some embodiments.

FIG. 2 illustrates another example of a tokenization system 200, in accordance with some embodiments. FIG. 2 shows signal/data interactions between a secure element applet 105, a financial institution (FI) server 110, a token manager 120, an operating system of a mobile or user device 102, 202, and an operating system of a vehicle, Internet of Things (IoT), or other device 210. A user 10 of the mobile or other device 102, 202, having accessed a wallet or other account/payment management application 104, requests a payment token for use in a current or future card present or other payment transaction. The mobile device 102, 202 obtains a vehicle identifier or other information from the vehicle including, for example, the vehicle's owner. The mobile device 102, 202 generate an identity token or cryptogram based on the vehicle information and sends this to the token manager 120. The token manager 120, having accessed suitable information from the FI server 110, generates and provides a secure token data set, including or otherwise associated with suitably-configured encryption key information, to the secure applet 105 on the user device 102, 202, as for example by working through, or in conjunction with, a wallet or other payment management application 104 and suitable wireless or other communications systems on the user device 102, 202. The token data set provided by the token manager 120 has been decrypted by the secure applet 105, using a transaction-specific identifier such as a transport key (which can be implemented by using either public and/or private keys such as those disclosed herein), and placed in persistent, preferably secure storage 106, 116, 137 on the device 102, 202, for storage until a payment transaction is requested by the user 10.

Figure 3A:
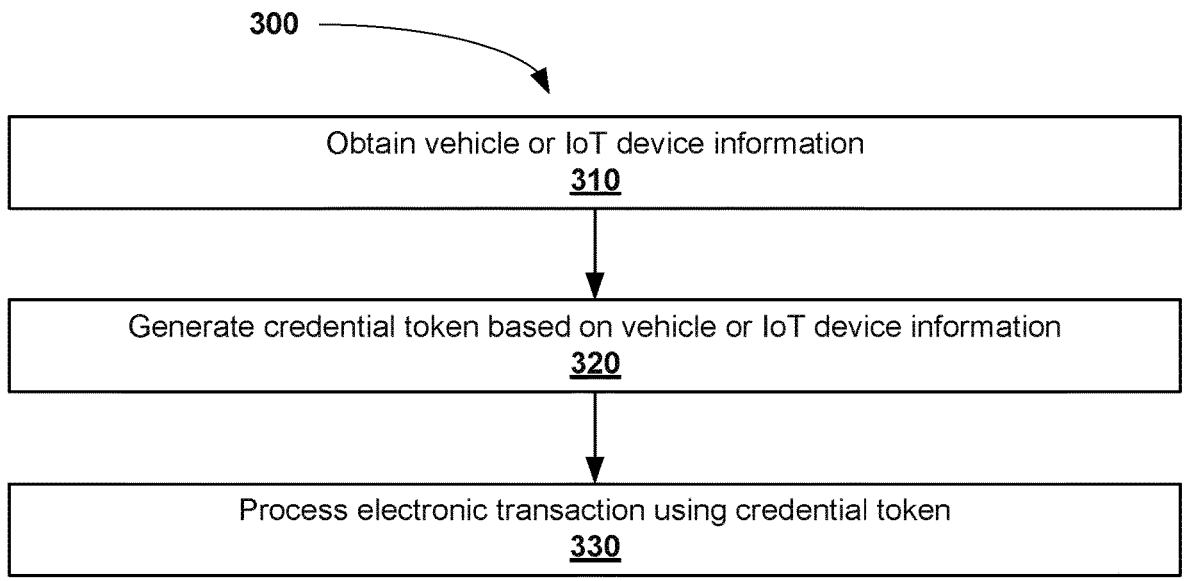
FIG. 3A illustrates, in a flowchart, an example of a method for tokenizing a credential, in accordance with some embodiments.

FIG. 3A illustrates, in a flowchart, an example of a method 300 for tokenizing a credential 300, in accordance with some embodiments. The method 300 comprises obtaining vehicle information 310, generating 320 a credential token based on the vehicle information, and processing 330 an electronic transaction using the credential token. Other steps may be added to the method 300.

Figure 3B:
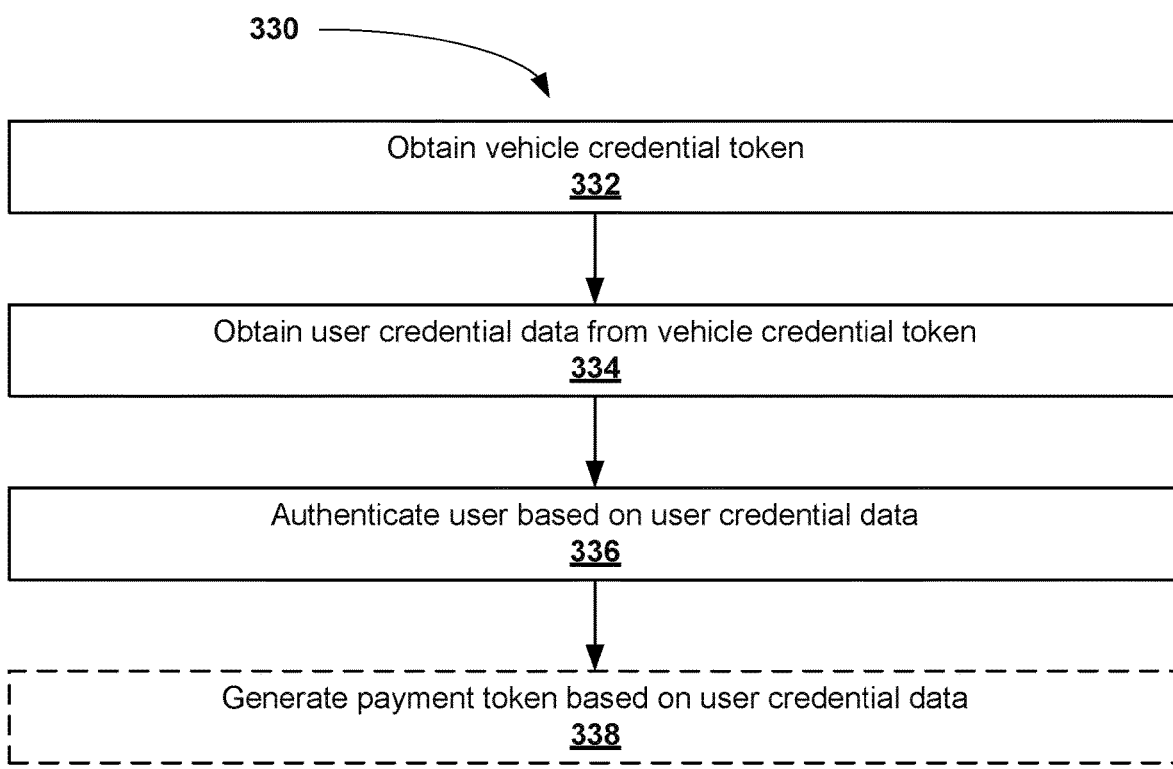
FIG. 3B illustrates, in a flowchart, an example of a method of processing electronic transaction using a credential token, in accordance with some embodiments.

FIG. 3B illustrates, in a flowchart, an example of a method 330 of processing electronic transaction using a credential token, in accordance with some embodiments. The method 330 comprises obtaining 332 the vehicle or IoT device credential token/information from a vehicle or IoT device to obtain 334 user credential information from the vehicle or IoT device credential token/information. The user 10 may be authenticated based on the user credential information. Once the user 10 is authenticated, a payment token may be generated 338 based on the user credential data. Other steps may be added to the method 330.

The user's 10 vehicle or IoT information may be obtained 310 by the user device 102, 202 and used to generate 320 an identification credential, such as an identification token or cryptogram. This identification credential may be used by a payment token manager 120 to generate 338 a payment token for the user 10 to be subsequently used in a payment transaction.

In some embodiments, the user's vehicle or IoT may be in sufficient proximity to a user's device 102, 202 prior to a transaction (for example, online at home or parked outside a store having a point-of-sale (POS) terminal). The distance may be defined as the range in which the vehicle or IoT device may wirelessly communicate with the mobile device. The vehicle or IoT device identification information may be used alone or in addition with other identification details (e.g., mobile device identification information) to authenticate the user 10. For example, if the user's vehicle (or IoT device) and mobile device are in the same proximity (within Bluetooth, WiFi, or other short range wireless communication protocol range) when an electronic transaction is being made or when a pre-paid token is being requested, then the mobile device may obtain the details from the vehicle or IoT device to generate the identity credential to be passed onto the token manger 120. In some embodiments, this may add extra security in case either of the mobile device or vehicle (or IoT device) of the user has been misplaced or stolen.

It should be noted that the teachings above may be implemented using any Internet of Things (IoT) device associated with the user 10. In some embodiments, a combination of IoT devices, including a vehicle, may be used to obtain sufficient user credential details to generate a user identity token. Different security levels may require different types or different numbers of IoT device information to provide a level of trust for the identity token that can be stored and protected on a secure element applet memory.

In some embodiments, the vehicle information may be used to assist with management of IoT devices or other online transactions. For example, attributes of a vehicle may be used to determine if the vehicle requires service and/or gas. In some embodiments, payment for gas or vehicle service may be effected when the vehicle information shows a change in vehicle attributes. I.e., gas was low, gas is now full, therefore it is appropriate for a payment for the gas to be request by the user. Therefore, the vehicle information can also be used to authenticate a transaction associate with a user 10.

In some embodiments, the IoT information can also be used to authenticate a payment transaction from a vendor's perspective. For example, an item in a store that has IoT capabilities or tracking may be the subject of a transaction. If the item is still in the store, then the item may be purchased. If the item's attributes state that it is no longer in the store, then any transaction for that item may be denied authentication.

In some embodiments, the vehicle or IoT information can be used to access a premises (i.e., open a door) or for other electronic transactions. For example, the vehicle information and mobile device information may be used separately or together to authenticate the location of the user 10. An identity token may be generated by the mobile device using vehicle (or other IoT device) information to authenticate the presence of the user at a door. Once the user is authenticated, then the door will be unlocked and/or open.

Virtual Clean Room

Figure 4:
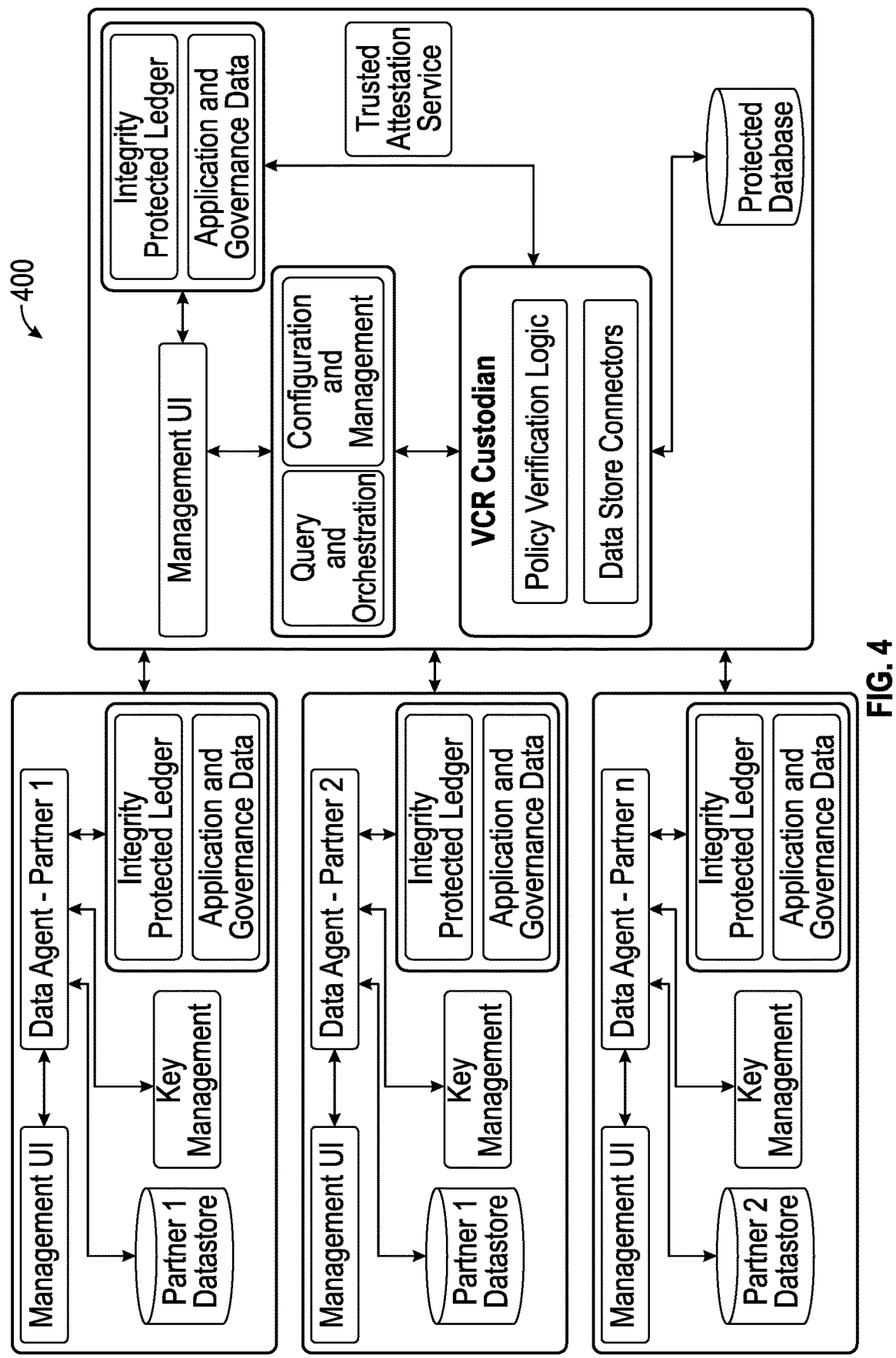
FIG. 4 illustrates, in a schematic diagram, an example of a multiparty secure computing environment, in accordance with some embodiments.

FIG. 4 illustrates, in a schematic diagram, an example of a multiparty secure computing environment (e.g., virtual clean room) 400, in accordance with some embodiments. The multiparty secure computing environment 400 may providing data process control. In the multiparty secure computing environment 400, multiple parties are able to load their secure information into a data warehouse having specific secure processing adaptations that limit both access and interactions with data stored thereon. The data is transformed upon loading such that the data is encrypted and stored in protected database elements. The loaded data warehouse can be interacted with to conduct data operations using combinations of the data sets.

A benefit of being able to utilize combined data sets for data operations is that, in some embodiments, queries can be run using combined aspects of both data sets that would otherwise be inaccessible to a single party. This is particularly useful where the parties operate in different fields or lines of trade, and the combined information can be used to run outreach campaigns based on combined information for improved targeting. The combined information can be utilized to conduct query operations that are not otherwise available to both parties, such as combining transaction data of a financial institution with SKU-level data of a merchant.

In a further embodiment, the combined data sets can be utilized for secure machine learning, for example, by a machine learning data architecture that is adapted to run within the limited computational confines of the one or more secure enclaves. The machine learning data architecture can thus be adapted to conduct complex analyses on a broader data set, and periodically generate output data sets indicative of the one or more outputs of the machine learning data architecture (e.g., logits, normalized predictions). Being able to conduct complex analyses on the broader data set allows for enhanced "big data" computations on larger sample sizes or with more complex characteristics being considered (e.g., conducting analyses on rare diseases or "black swan" events that occur so infrequently that they are often poorly represented in any one data set alone).

However, the parties may not trust the data policies of one another, network security, or the security of the computing infrastructure, and require enhanced technological assurances that sensitive data has strong data security provisions in place. Enhanced privacy and security are required as the data sets typically contain sensitive and proprietary data of the parties, or surrogates/derivatives of such data.

In particular, a data custodian architecture and a corresponding data agent architecture (including a data loader) are described for interoperation with a trusted execution environment having an isolated data processing subsystem storing protected database elements (e.g., in the context of a relational database, protected tabular database tables, or in a non-relational database, protected non-tabular data, such as documents or dynamically defined schemas). For the sake of efficiency and scalability, the enclaves do not store significant amounts of data. They store data in traditional file systems protected under keys that are protected via attestation policies and process data as needed.

The data custodian and the data agent, in some embodiments, can be implemented as data processes that operate in as software modules, for example, as daemon processes that can be interacted with through query requests, etc., by way of an application programming interface (API). In some embodiments, the data agent can provide an interface layer through an API that translates various requests for automatic provisioning through the secure enclave system (e.g., data load or query processing). For example, for a specific user or process, it may appear simply that the interface is able to conduct queries across multiple data sets, even if the data set is not owned by party making the query.

The data custodian is a data process that, in an embodiment, is operated by a secure enclave data processor that conducts automated policy enforcement of data protection policies to periodically or continuously ensure that privacy principles of the secured environment are being adhered to. The data custodian data process can operate at various times of an interaction with protected data, such as validating a query when the query is received, controlling the underlying access to protected information, or validating a final output data object before it is exposed outside of the secure enclave environment.

The data custodian applies the data protection policies to control whether the query should be processed or rejected, and the data protection policies can include data-level data protection policies, global data protection policies, or party-specific data protection policies.

For data-level data protection policies, the underlying data may be associated or flagged with (e.g., in accompanying metadata) including the types of query operations that are permitted or prohibited, or if additional transformations are necessary to the data before it can be surfaced (e.g., replacement with a hashed surrogate version). For example, the data-level data protection policies can allow aggregate level operations (e.g., count the number of customers having purchased avocadoes in August), but prohibit inclusion of the specific sensitive information in any outputs (e.g., names, dates of birth, social insurance numbers, credit card numbers, phone numbers, addresses, pre-existing health condition status can all labelled non-exportable and in accordance with such a policy, any query attempting to obtain any of these as an output will be declined). In some embodiments, data-level data protection policies are provided in coupled metadata, stored, for example, in a separate tabular row or column, or as reference data objects (e.g., using pointers to establish interrelationships).

Transformations can be used, for example, to conduct hashing of sensitive information in some aspects to replace information with a surrogate (e.g., John Smith->328faa9b4e0a798947a8c80913e993d4). As described in some embodiments, the transformations may modify data even further by perturbing the data to cause loss of fidelity. An example lossy transformation can include intentionally modifying values prior to transformation, applying lossy compression, or intentionally using a small hash mapping. Accordingly, the lossy transformation, even when reversed, yields an intentional level of computational uncertainty, at the cost of accuracy of the output data set.

For global data protection policies, various types of underlying data can always be set as having specific permissions or prohibitions always occurring. For example, a global data protection policy can enforce various technical and operational standards (e.g., those adapted to protected credit card information). These policies can apply regardless of the party who originated the loaded data. An example global data protection policy can include a prohibition on extracting from a query, which party specific information originated from. This can be a useful increase in privacy as, for example, for a very rare disease, even identifying an insurance provider may be enough to identify the individual. Similarly, there may be use cases where the parties themselves do not wish to be identifiable (e.g., anonymous submissions of code vulnerability reports).

Party-specific data protection policies can include specific requirements provided by a party in respect to all original data owned by or provided by the party, and in some embodiments, can be inherited by any data derived from the original data owned by or provided by the party as well. For example, a financial institution may enforce a policy whereby all data associated with the financial institution must be replaced with surrogate data, or whereby all account numbers are protected with a highest level of access security.

Party-specific data protection policies can also be used to control access by various parties and to control remuneration (e.g., a compensated data exchange wherein the underlying data is always protected with privacy preserving principles) or other type of statistical usage tracking. For example, in some embodiments, a party may seek to obtain remuneration for its efforts in making data available and a policy may be to set an access control list for its data. In another embodiment, the system may track data usage and interconnections to establish an audit trail in the event of a breach or to track statistics on which data sets were more often accessed.

The data custodian data process accordingly controls the processing of a query received in the form of a query data object. The query data object represents a proposed query to be operated on one or more protected database elements residing on the protected memory region, and the proposed query can include, in some embodiments, domain-specific language instructions for parsing (e.g., SQL queries), natural language processing queries, or other types of query language based queries. The proposed query can be, for example, a query that utilizes the combination of two different database portions provided from different parties. In some embodiments, the protected data elements create an intermingled database from the various parties, and in some embodiments, it may be intentionally difficult to discern which protected data elements are provided from which party.

Upon a determination that the query data object adheres to the data protection policies, the data custodian data process generates and transmits a control message (e.g., a "quote message") to an attestation process to validate that the data custodian data process is operating on the secure enclave data processor. The control message can include elements of information, such as a hash of the software code of the secure enclave to attest that the code is of a specific version and has not been tampered with, a version number or a firmware number of the secure enclave, various physical or identifying characteristics of the enclave (e.g., operation on a processor bearing the serial number 1GH5HY, on software build 1503), among others. The control message is provided, for example, to an attestation service or process which responds with an attestation token data object. The attestation token data object is then utilized by the data custodian data process to release data protection keys for the unlocking of the protected database elements. For example, the attestation token data object can be provided to a key manager process to obtain the data protection keys. The query can then be executed on the protected database elements after they have been unlocked. In a machine learning scenario, rather than having singular queries conducted, periodic or multiple queries may be handled by the data custodian data process, for example, to continually update the machine learning model data architecture based on incrementally received information to continue tuning the machine learning model data architecture during a training phase. In some embodiments, the training phase is continuous as the machine learning adapts to changes to current trends.

In some embodiments, the query response data object is encrypted using a public key associated with a requesting party prior to provisioning as an encrypted output data object. In this embodiment, the query response data object is not exposed, and instead, only the encrypted output data object is exposed to further improve computational security and reduce potential exposure.

In some embodiments, the query response data object is inspected based on at least one of the data protection policies to ensure that the query response data object also adheres to the data protection policies. This is useful in a situation where a query is adapted maliciously or inadvertently to leak specific information (e.g., where a credit card number is not allowed to be exportable, but the query validation policy inadvertently allowed the number ×2, which can then be easily reversed). A subset of policies can be adapted to investigate the query response data object as a secondary sanity check to ensure the policies were indeed adhered to. An example subset of policies can include preventing the output of any query results where a nine digit number is output (e.g., which may be a social insurance number).

In an example implementation, the systems and methods can be provided in the form of a physical computer device, such as a computer server or a special purpose computer appliance (e.g., a rack mounted device that is interconnected with a message bus). The physical computer device may house one or more secure enclaves in one or more trusted execution environments. In some embodiments, multiple enclaves can be hosted together using virtual machines orchestrated by a hypervisor. In another embodiment, a single enclave can be established across many different machines using distributed resources through the coupling of multiple sub-enclaves. A machine learning model architecture, in some embodiments, can reside within a protected memory portion and can operate autonomously with a data custodian data process, periodically requesting updated information for conducting iterative training. In another embodiment, the machine learning model architecture itself is protected alongside the data and runs alongside the data, and access is required from the data custodian data process to access the machine learning model architecture.

In another aspect, the data agent is a data process that can reside within or can be coupled to a party's computing systems. The data agent data process does not necessarily need to reside within the secure enclave, and in some embodiments, the data process can be an interface or a software module that is operable on partner computer devices, or an intermediary computer device adapted for interoperability.

The data agent data process is configured to receive data inputs indicative of a schema of data elements (e.g., data tables) that the data agent is adapted to load data into. The data agent data process receives raw data from a data repository (e.g., SKU-level transaction data) and conducts one or more validation processing steps to process the raw data in accordance with the schema requirements.

These validation processing steps are particularly important as once loaded into the secure enclave, it may be very difficult or impossible to change or update the data. Accordingly, the insertion of unclean, incorrect, malicious, or incomplete data could have significant negative effects that the data agent data process is adapted to mitigate.

These validation processing steps can include, in some embodiments, the application of formatting (e.g., time code formatting), security (e.g., avoiding SQL injection attacks), or sanity checks (e.g., blank avoidance, numerical validation), and in some embodiments, additional transformation to the data is conducted, for example, to perturb specific data values to add a level of uncertainty (e.g., credit scores can be adjusted so specific credit scores are never provided, even into the secure enclave). In some embodiments, the data is transformed such that the data is replaced with surrogate data at this step.

The data can have one or more associated data-level data protection policies applied at this step through, for example generation of metadata or adding information into the database structure (e.g., adding rows or columns to the table). In some embodiments, the schema itself includes space (e.g., columns) for metadata indicative of data-level data protection policies. Data-level data protection policies can include aspects such as ensuring that specific data is never exposed ("NE") as is, and this can be used, for example, for sensitive information, such as addresses or names. On the other hand, information such as ZIP codes, can be coded as exposable. In some embodiments, the data itself is formatted with metadata associated with a confidence level/score attesting to the accuracy of the data. For example, time data obtained by a GPS system can be extremely precise, while time data obtained by a computer clock has limited precision. The confidence level/score can be used during downstream processing to indicate the limits of possible precision as the lowest accuracy level of the combined data, for example. In this example, the combined data should likely not be utilized for location determinations requiring highly precise time values.

In some embodiments, the data agent data process operates with a key manager data process to encrypt the data prior of encrypted data packets to the secure enclave system for loading onto as protected data elements. In some embodiments, the encryption is conducted using a public/private key shared in advance with the secure enclave so that the secure enclave is able to decrypt the transmitted data and load the data into the protected data elements (in some embodiments, encrypting it again using an internal key and inserting it into the secure enclave). In some embodiments, for efficiency and scalability the enclaves do not store large amounts of data. Data is stored in traditional file systems by keys protected via attestation policies.

IoT Payment System

In some embodiments, there is provided a software/hardware data exchange standard that can be embedded within the Trusted Execution Environment (TEE) of a system on chip (SOC) and then deployed across multiple devices eliminating the excessive effort of individual certification by each Original Equipment Manufacturer (OEM) for each device.

In some embodiments, touchless payment may be provided. For example, a retail store with several in store devices embedded with SOCs such as autonomous check-outs, smart shelves, in-store digital kiosks and other devices that could all serve as a point of payment and check-out. In some embodiments, an internet enabled device (e.g., smartphone) may make a payment to a next-gen checkout device powered by IoT (in this case, the payment is assumed to be more secure than current-state; or perhaps same level as current-state but in an IoT world).

In some embodiments, transactions can take place at least as fast as current methods today (TPS: Transactions Per Second is the industry unit of measure), and are at least as secure as current methods today.

In some embodiments, an IoT payment application/system may be device agnostic (payment receiver). For example, a user may want to be able to use a smartphone (or connected vehicle or IoT device) to initiate the payment transaction. As such, the user may want to trust the payment generator device. One option is to bind the payment generator device to the identity of the user using the smartphone. One assumption includes that as long as the payment receiver device is compatible with underlying radio frequency (RF), it should support payment generating devices that also support the respective RF.

In some embodiments, an IoT payment application/system may have seamless connectivity. For example, a user may want to seamlessly connect his/her smart device (or connected vehicle or IoT device) to a payment terminal in order to accomplish the payment transaction. This may occur, for example, when: i) a user is ready to make a payment in front of the receiving terminal; ii) a user needs his/her smart device to send (communicate) payment information to the receiver device; iii) a user does not prefer which connectivity method is required, but he/she does value speed, seamless connection and security; and/or iv) a user needs to get a clear message when his/her device has been connected to the receiver device and is ready to make the payment. Drivers for seamless connectivity include security, speed and bandwidth. Several radio frequencies can be utilized, such as: BLE (Bluetooth Low Energy), Wi-Fi Direct, NFC, or other wireless communication technologies. In some embodiments, the underlying RF should be widely supported, such as Wifi Direct or BLE, but could also be tailored to other RF, such as UWB or NFC. A combination of/hybrid approach to RF is also feasible. In some embodiments, there is an expectation that a payment application will need to communicate with several payment receivers as they move along the retail store. This provides the challenge of how to identity and connect with each individual payment receiver.

In some embodiments, an IoT payment application/system may provide 'No Touch' Pay. For example, a user may desire to have little to no physical contact with devices that are not their own in order to conduct a payment transaction. This may occur, for example, when: a user wants to use his/her smart device to make a payment; and/or a user would like to NOT Tap his/her device physically touch the receiver payment device. In some embodiments, a communication medium standard will assist with widespread implementation, and a failure rate should approach zero (especially for payments).

In some embodiments, an IoT payment application/system may provide bolstered security. For example, a user may expect the security of the payment transactions to be better or at-par with current security standards adopted by FIs, regulators, and merchants. Tokenization may assist with security.

In some embodiments, an IoT payment application/system may monitor data privacy. For example, a user may be concerned about their data and privacy, such as knowing who is using the payment information. In some embodiments, the application may relay back a log of real time data on who and for what purpose past purchase information is being used. Different identifiers may be used (e.g., technology used for contact tracing by service providers). Different communication standards may also affect data privacy.

Figure 5:
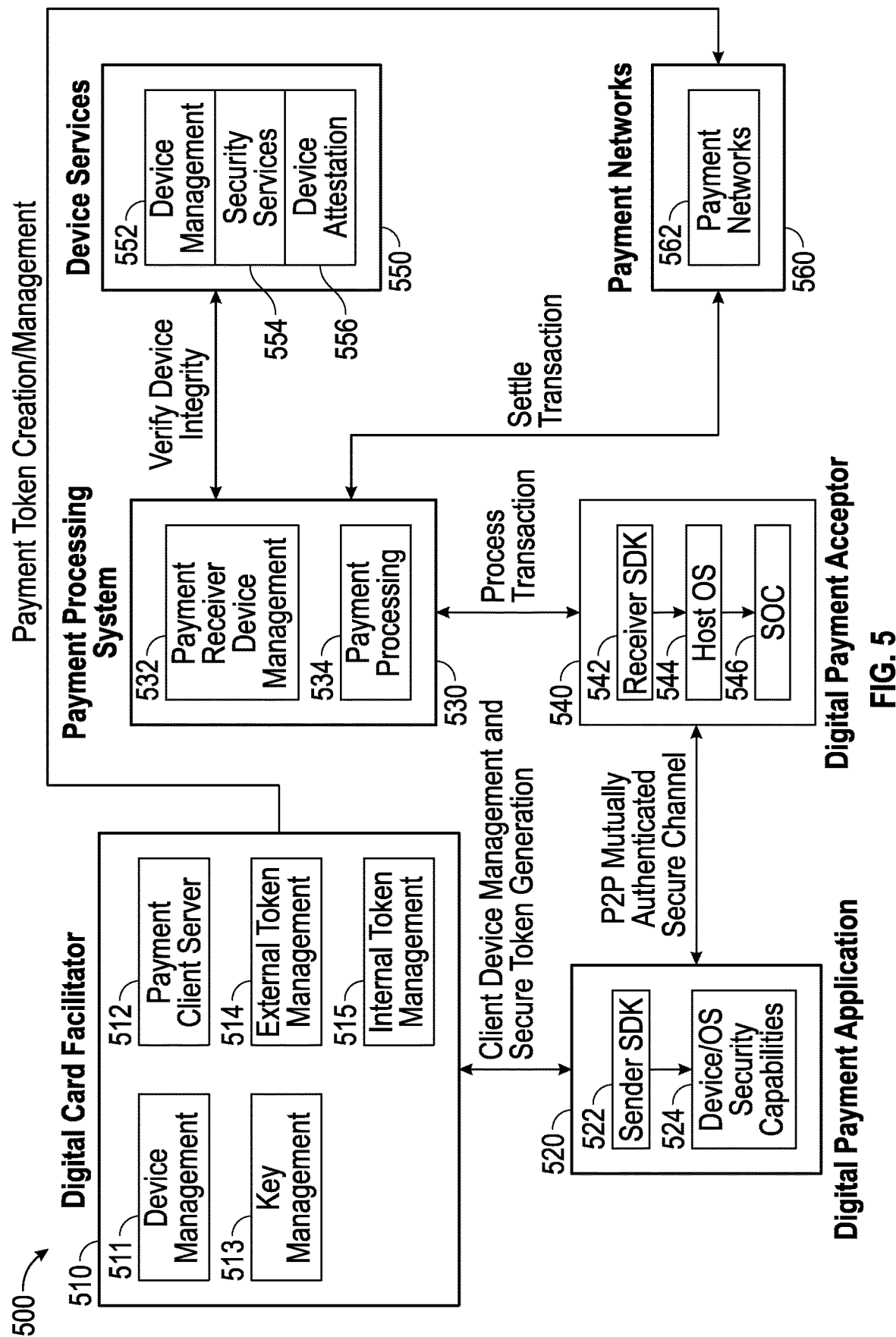
FIG. 5 illustrates, in a schematic, an example of an IoT payment application/system architecture, in accordance with some embodiments.

FIG. 5 illustrates, in a schematic, an example of an IoT payment application/system architecture 500, in accordance with some embodiments. The IoT payment architecture 500 comprises a digital card facilitator 510, a digital payment application 520, a payment processing system 530, a digital payment acceptor 540, a device services component 550 and a payment networks component 560. The digital card facilitator 510 may communicate with the digital payment application 520 for client device management and secure token generation. The digital card facilitator 510 may also communicate with the payment networks component 560 for payment token creation and management. The digital payment application 520 may also communicate with the digital payment acceptor 540 over a P2P mutually authenticated secure channel. The payment processing system 530 may communicate with the digital payment acceptor 540 to process a transaction. The payment processing system 530 may also communicate with the device services component 550 to verify device integrity, and with the payment networks 560 to settle transactions. Other components may be added to the an IoT payment application/system architecture 500.

The digital card facilitator 510 may include a device management unit 511, a payment client server unit 512, a key management unit 513, an external token management unit 514 and an internal token management unit 515. Other components may be added to the digital card facilitator 510.

The digital payment application 520 may include a sender software development kit (SDK) unit 522 for establishing a secure communication channel and the exchange of data, and a device/operating system (OS) security capabilities unit 524 for storing and using keys for the establishment of the secure communication channel and exchange of data. Other components may be added to the digital payment application 520.

The payment processing system 530 may include a payment receiver device management unit 532 for facilitating confirmation that payment information is being received from a valid payment receiver, and a payment processing unit 534. In some embodiments, the payment processing unit 534 may access a virtual clean room (VCR) 400. Other components may be added to the payment processing system 530.

The digital payment acceptor 540 may include a receiver SDK unit 542 for establishing a secure communication channel and the exchange of data, a host OS unit 544, and a system on chip (SOC) 546. Other components may be added to the digital payment acceptor 540.

The device services component 550 may include a device management unit 552, a security services unit 554 for provisioning shared secrets for future key generation, and a device attestation unit 556. Other components may be added to the device services component 550.

The payment networks component 560 may include one or more payment networks 562 such credit card networks or interact debit networks. Other components may be added to the payment networks component 560.

In some embodiments, security features of the an IoT payment application/system architecture may include secure key generation and storage on the digital payment acceptor 540; secure random generation on the digital payment acceptor 540; secure P2P communication channel between payment generator 520 and digital payment acceptor 540; secure network communication between digital payment acceptor 540 and payment processor 530; compliance with global platform TEE profile certification; services for device management 552 and attestation 556.

Applications

As automobiles become more connected, the expectation rises on OEM players to provide with best-in-class experience to its customers, highlighting an opportunity for OEMs to partner with financial institution (FI) partners to compete against big-tech. In some embodiments, a standardized protocol for electronic transactions (e.g., movement of money, financial information and sensitive data) is provided. A set of standard rules and principles to help move money (and other sensitive information) from automobiles. An application programming interface (API)/SDK may comprise a modular development approach that enables other FIs and developers to connect and build upon the solution, providing greater odds of mass adoption. An ecosystem may provide the ability to service client needs in a manner that makes it valuable and convenient to stay within a singular ecosystem.

Building a financial marketplace around automobile/client needs may assist with the creation of an 'ecosystem' that provides several benefits to consumers and OEMs. Automobile payments may be utilized to help build and showcase the value of a financial marketplace embedded within an automobile, straight from the OEM. In some embodiments, the automobile may be at the center of client interactions, which: provides increased brand visibility and value to end-consumers; provides secure, simple, and contextual interaction of automobiles for payments; and enables development of ecosystem for related products and client needs.

Figure 6:
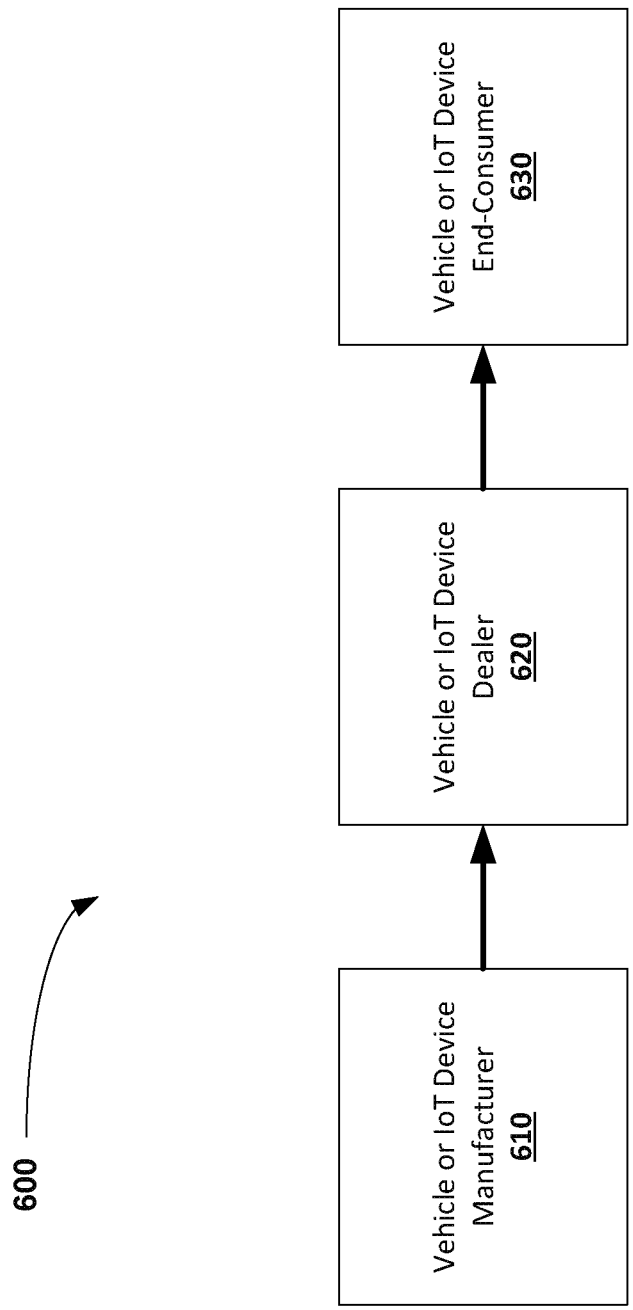
FIG. 6 illustrates, in a flow diagram, an example of stages of an automobile interaction with an IoT payment system, in accordance with some embodiments.

A financial marketplace may assist with tracking an automobile and help engage with clients throughout different stages, from manufacturing to end-sale (and beyond). FIG. 6 illustrates, in a flow diagram, an example of stages of an automobile interaction with an IoT payment system 600, in accordance with some embodiments. As an automobile is manufactured 610, its unique identifier (ID) is transmitted to FI's financial systems to facilitate loans provisions to dealers, also providing ability to track the asset. The automobile then moves to dealers 620 where same ID can be utilized to provide financing and bundle offers to end-consumer. After automobile is sold to the end-consumer 630, they may use a financial marketplace (powered by unique ID) to pay for gas, tolls, etc.

Along that process, several opportunities can be serviced using the financial marketplace, to the benefit/convenience of consumers. Combining strengths and value propositions of all partners, a payments ecosystem for automobile owners may be created that will enable a frictionless payments and enhance value-add experiences. From the time of pre-purchase to after-sales, a financial marketplace can render to all financial needs of the automobile, as well, its customer. Use-case examples include:

- Financing & Leasing: Leasing and financing can be facilitated right from the manufacturer to the dealer to the end-customer, removing tons of operational friction, ensuring singular tracking of vehicle from beginning to end.
- Repairs & Maintenance: Intelligent sensors can assist with identifying the right time to service, repair, or change automobile parts, and the marketplace can seamlessly facilitate all operational and financial aspects of the activity.
- Fuel & Discretionary Purchases: Marketplace can facilitate seamless payments with gas stations, drive-through, etc. to ensure end-customer focuses more on car and less on other devices (i.e., smartphones, IoT devices), while enjoying value-add experiences.

In some embodiments, payments on a universal use-case (e.g., refueling) may be facilitated. Pursuing the potential of automobile payments, enabled via a marketplace, can help achieve a variety of objectives, creating an "OEM Marketplace/Wallet" for transactions, including financing and leasing, repairs and maintenance, fuel and discretionary purchases, and other electronic transactions.

In some embodiments, core payments functionality may be provided. This delivers on core functionality of the market place—the ability to process payments. For example, a universal use-case may include purchasing fuel in a gas station.

In some embodiments, value-add use-cases may expand the capability of the marketplace by partnering with more merchants and providing more value-add use-cases. Offers such as prepaid gas/tolls may be bundled.

In some embodiments, API/SDK may be offered to partners. An open protocol/standard may be created for other FIs and merchant partners to participate in, and for the platform to be open to a developer community to help build on top of existing, core marketplace.

Figure 7:
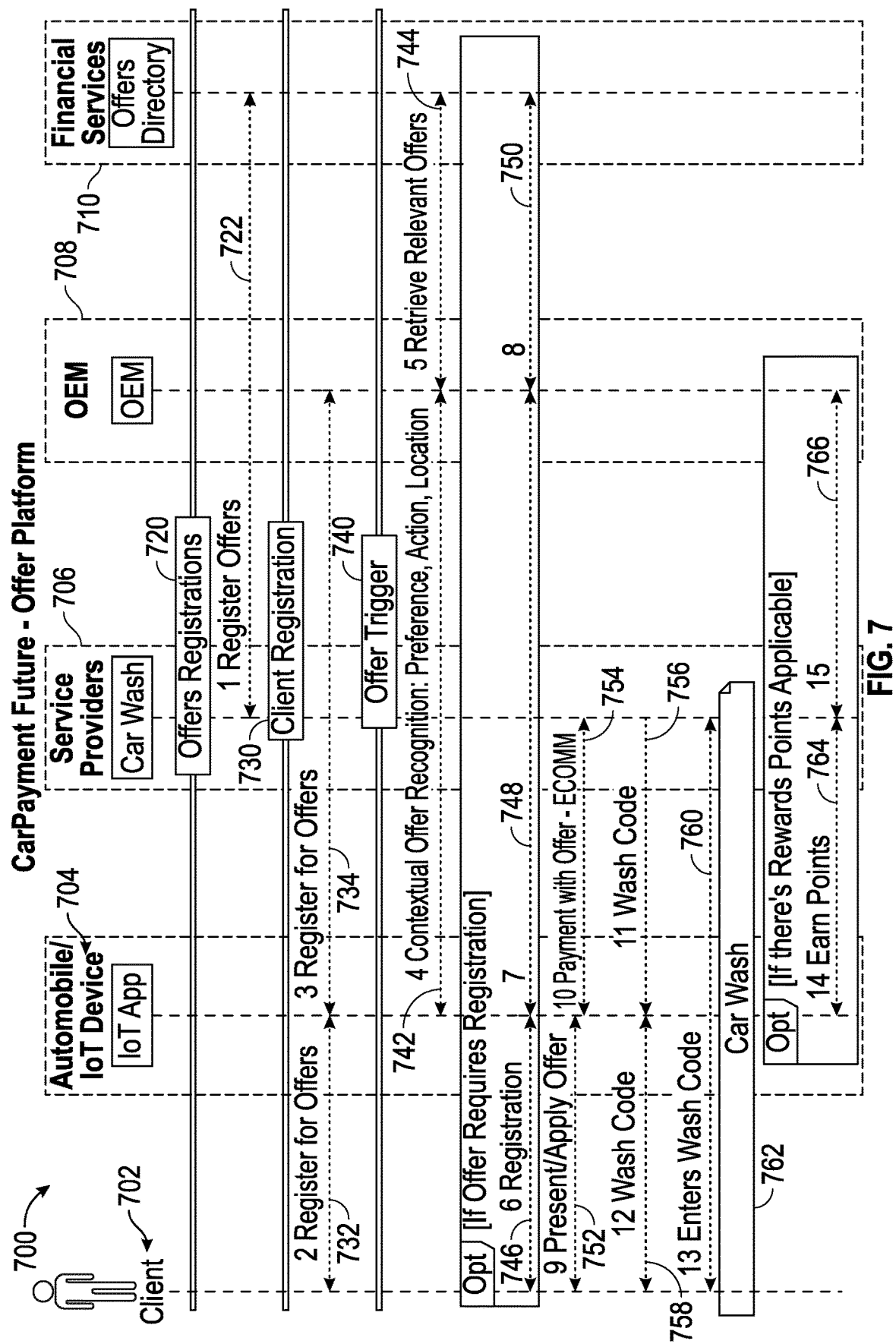
FIG. 7 illustrates, in a call flow diagram, an example of methods of providing an offer platform, in accordance with some embodiments.

FIG. 7 illustrates, in a call flow diagram, an example of a method of making an electronic payment using an IoT device 700, in accordance with some embodiments. The method involves the use of offers from a financial service (e.g., a loyalty program). While the example provided is described with respect to payments made using via vehicles for a service to the vehicle, the method 700 may be applied to IoT devices generally. The method comprises an offers registration 720, a client registration 730 and an offers trigger 740. An offer registration 720 comprises a service provider (e.g., a merchant such as a car wash) 706 registering 722 an offer with a financial service (e.g., a loyalty program) 710. A client registration 730 comprises a client (e.g., a user) 702 registering 732 for an offer using an IoT device (e.g., automobile) 704. The IoT device 704 may then register 734 for the offer with the IoT device OEM 708.

An offer trigger 740 comprises the IoT device 704 sending a contextual offer recognition message 742 to the OEM 708 (including preferences, actions, locations, etc.). In some embodiments, a plurality of OEMs 708 or a plurality of financial services 710 may participate in a multiparty data exchange (e.g., VCR) that allows the OEMs 708 and/or the financial services 710 to share preferences, actions, locations, or other information of IoT devices 704 anonymously and without exposing identifiable characteristics of any particular IoT device. Such sharing of information may allow for more robust and targeted offers to be presented to an IoT device 704. For example, a vehicle (IoT device) 704 may be travelling with low fuel. The financial services 710 may have stored past transactions or other data indicating a preference for a gas station merchant (service provider) 706. Offers relative to that merchant chain 706 may be presented to the vehicle 704 without the OEM 708 and financial service 710 having to expose identifiable information pertaining to the vehicle 704. Thus, the OEM 708 may retrieve 744 relevant offers from the financial service 710. Optionally, if the offer requires registration, then the client 702 may use (e.g., input a message into) 746 the IoT device 704 to communicate 748 with the OEM 708 to register 750 with the financial service 710. The offer may be presented/applied 752 by the client 702 using the IoT device 704 when making an electronic commerce payment 754 together with the offer to the service provider 706. There service provider 706 may provide 756 a code (e.g., a wash code) to the IoT device 704 which may display 758 the code to the client 702. The client may input/enter 760 the code (e.g., enter the wash code) on a service provider 706 device. The device 704 may then be serviced 762 (e.g., car washed). Optionally, if rewards or other points are applicable, the IoT device 704 may earn 764 the points from the service provider 706 which communicates 766 the earned points with the OEM 708. Other steps may be added to the method 700.

Figure 8:
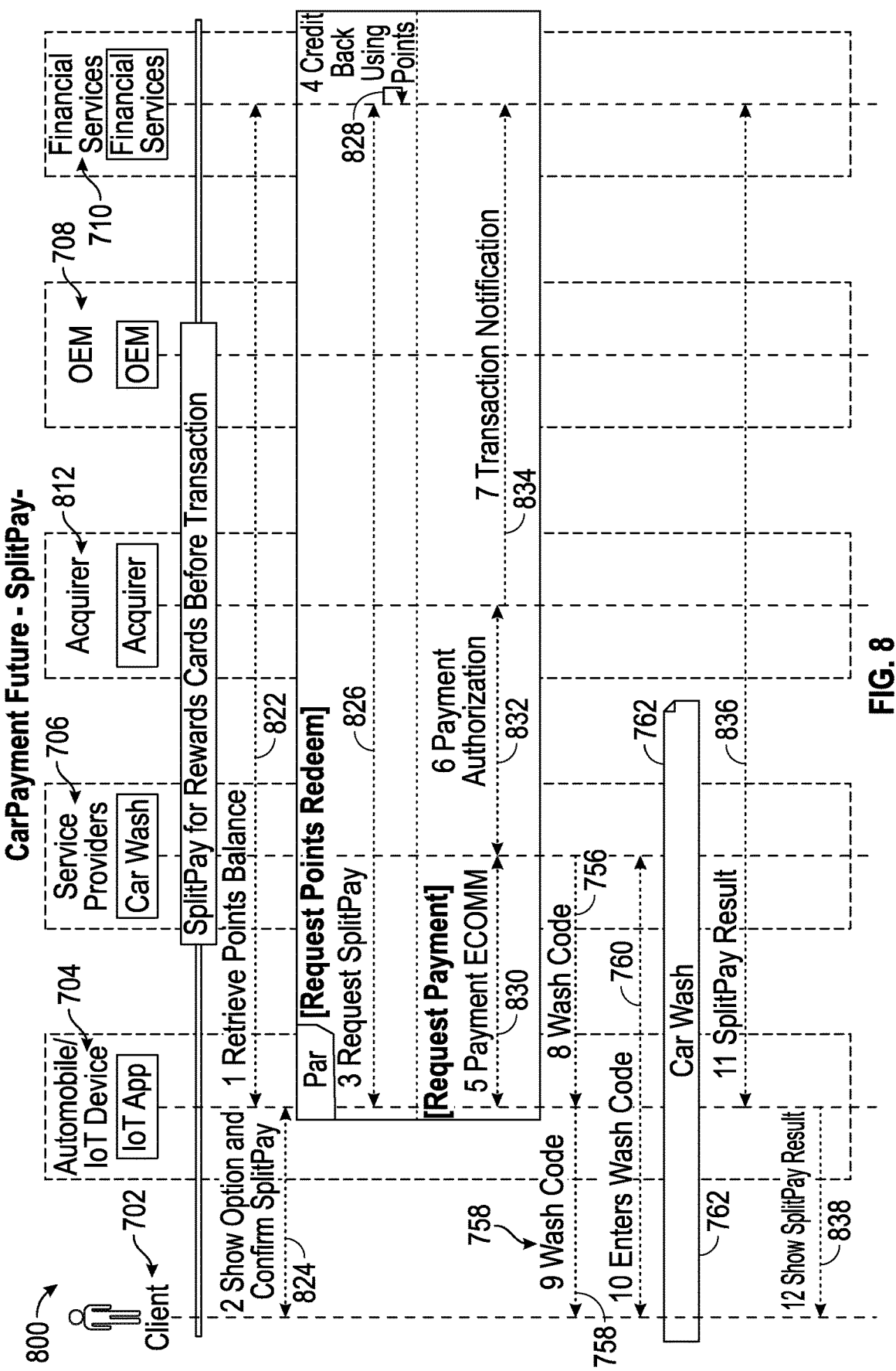
FIG. 8 illustrates, in a call flow diagram, another example of a method of making an electronic payment using an IoT device, in accordance with some embodiments.

FIG. 8 illustrates, in a call flow diagram, another example of a method of making an electronic payment using an IoT device 800, in accordance with some embodiments. The method involves the use of rewards as a partial payment. While the example provided is described with respect to payments made using via vehicles for a service to the vehicle, the method 800 may be applied to IoT devices generally. The method 800 comprises an IoT device (e.g., automobile) 704 retrieving 822 a points balance from the financial services (e.g., loyalty program) 710. The IoT device 704 may then display 824 the points to, and receive confirmation input from, the client 702 to split the payment using the rewards points. The IoT device 704 may then request 826 partial payment using the rewards from the financial service 710. The financial service 710 may then credit 828 back using the points. The IoT device 704 may also initiate 830 a partial electronic commerce payment for the remaining amount with the service provider 706. The service provided 706 may confirm 832 payment authorization with an acquirer 812 which then sends a transaction notification message 834 to the financial service 710. Upon receiving payment, the service provider 706 may then provide 756 a code (e.g., a wash code) to the IoT device 704 which may display 758 the code to the client 702. The client may input/enter 760 the code (e.g., enter the wash code) on a service provider 706 device. The device 704 may then be serviced 762 (e.g., car washed). The split payment result may then be confirmed 836 with the financial service 710 and then displayed 838 to the client 702. Other steps may be added to the method 800.

Figure 9:
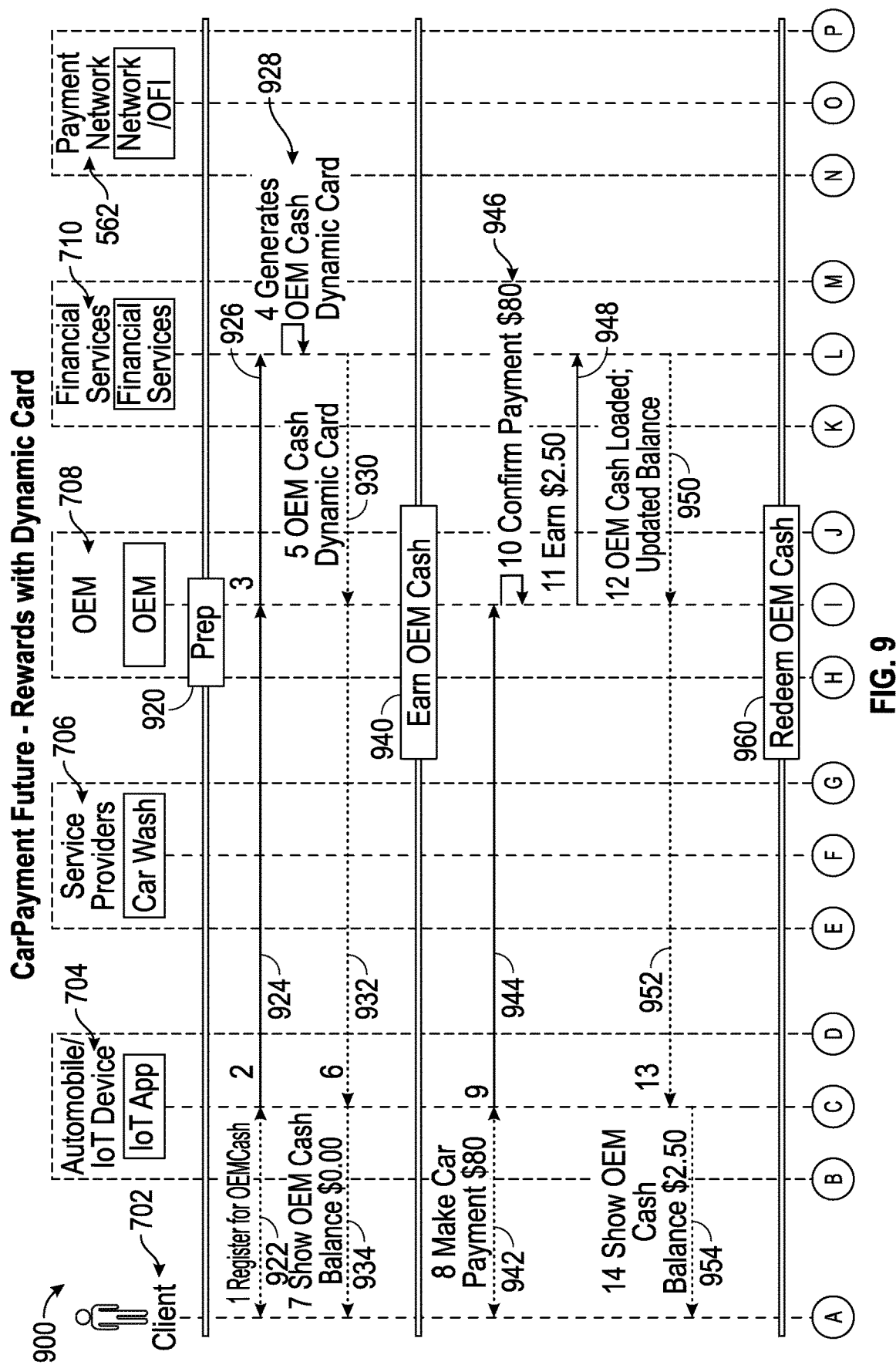
FIG. 9 illustrates, in a call flow diagram, another example of a method of making an electronic payment using an IoT device, in accordance with some embodiments.
Figure 9:
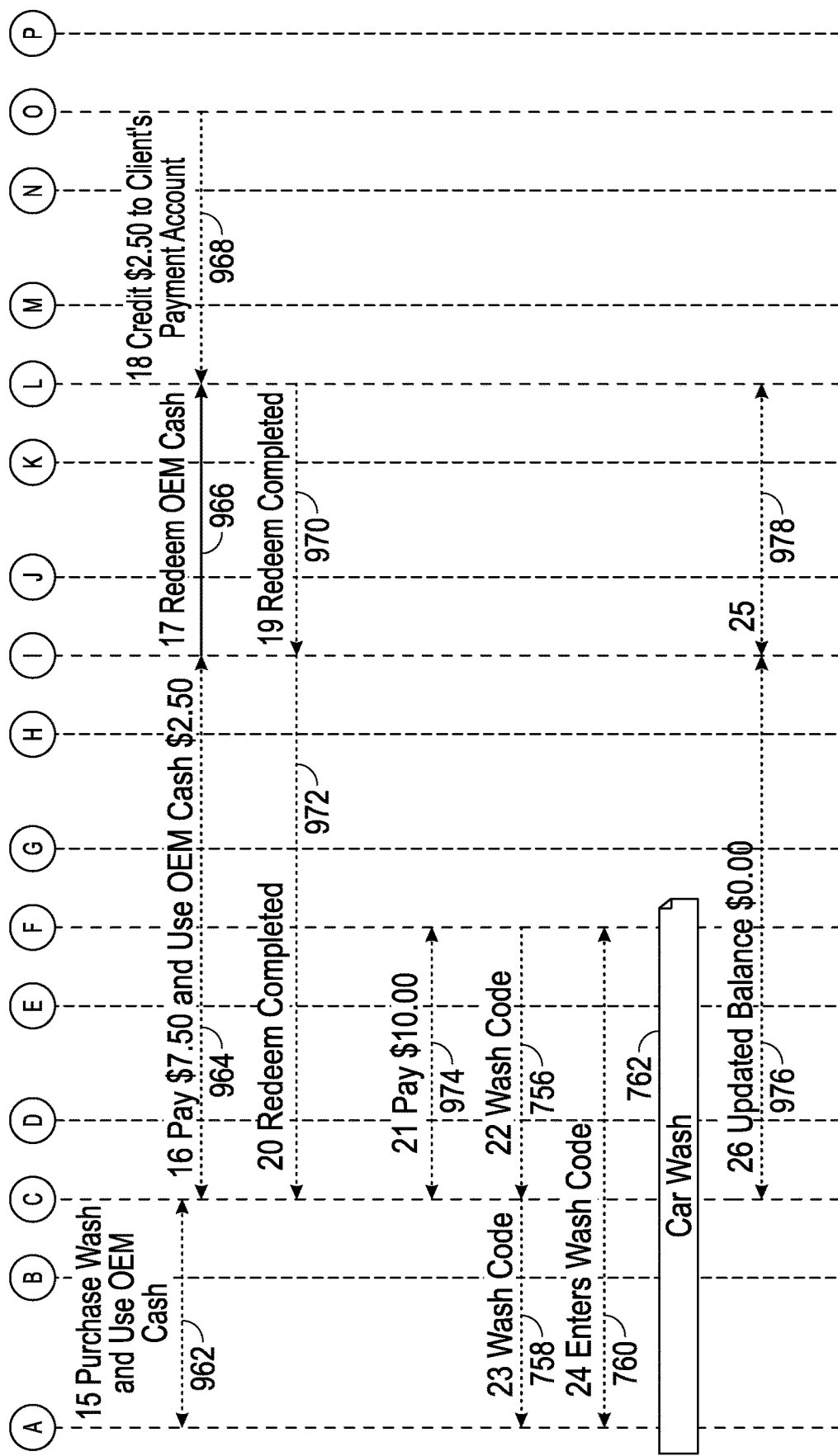

FIG. 9 illustrates, in a call flow diagram, another example of a method of making an electronic payment using an IoT device 900, in accordance with some embodiments. The method 900 involves the use of rewards and a dynamic card. While the example provided is described with respect to payments made using via vehicles for a service to the vehicle, the method 900 may be applied to IoT devices generally. The method comprises preparation of a dynamic OEM "cash" card 920, earning OEM "cash" 940 and redeeming the OEM "cash" 960.

The preparation of the OEM card 920 includes the client 702 using 922 the IoT device 704 to register 924 for the OEM card. The IoT device 704 registers with the OEM 708 which then registers 926 with the financial service (e.g., dynamic card) 710. The financial service 710 generates 928 the OEM card and sends 930 the card information to the OEM 708 that, in turn, sends 932 the card information to the IoT device 704 to display 934 to the client 702.

The earning of OEM "cash" 940 comprises the client initiating a payment 942 (e.g., inputting a car payment request) to the IoT device, which in turn, sends 944 the payment request to the OEM 708. The OEM 708 confirms the payment 946 and sends a "cash earned" message 948 to the financial service 710. The financial service 710 loads the OEM card, and updates the account balance, with the "cash earned" and sends 950 the updated card details to the OEM 708. The OEM 708 sends 952 the updated card details to the IoT device 704 that can display 954 them to the client 702.

The redemption 960 of OEM "cash" comprises the client using 962 the IoT device 704 to make a purchase (e.g., purchase a car wash) using the OEM card. The IoT device 704 may send a payment request 964 to the OEM 708 using the amount available on the OEM card to (partially) pay for the purchase. The OEM 708 sends 966 a redeem OEM "cash" message to the financial service 710 for the amount on the OEM card (up to the purchase price). The financial service 710 then sends a message 968 to a payment network 562 to credit the client's payment account. The financial service 710 may then send a redemption completion message 970 to the OEM when then sends a redemption completion message 972 to the IoT device. The IoT device then sends a payment request 974 to the service provider 706. Upon receiving payment, the service provider 706 may then provide 756 a code (e.g., a wash code) to the IoT device 704 which may display 758 the code to the client 702. The client may input/enter 758 the code (e.g., enter the wash code) on a service provider 706 device. The device 704 may then be serviced 760 (e.g., car washed). The IoT device 704 may then send an update balance message 976 to the OEM 708 to send an update balance message 978 to the financial service 710 to update the account balance accordingly. Other steps may be added to the method 900.

Figure 10:
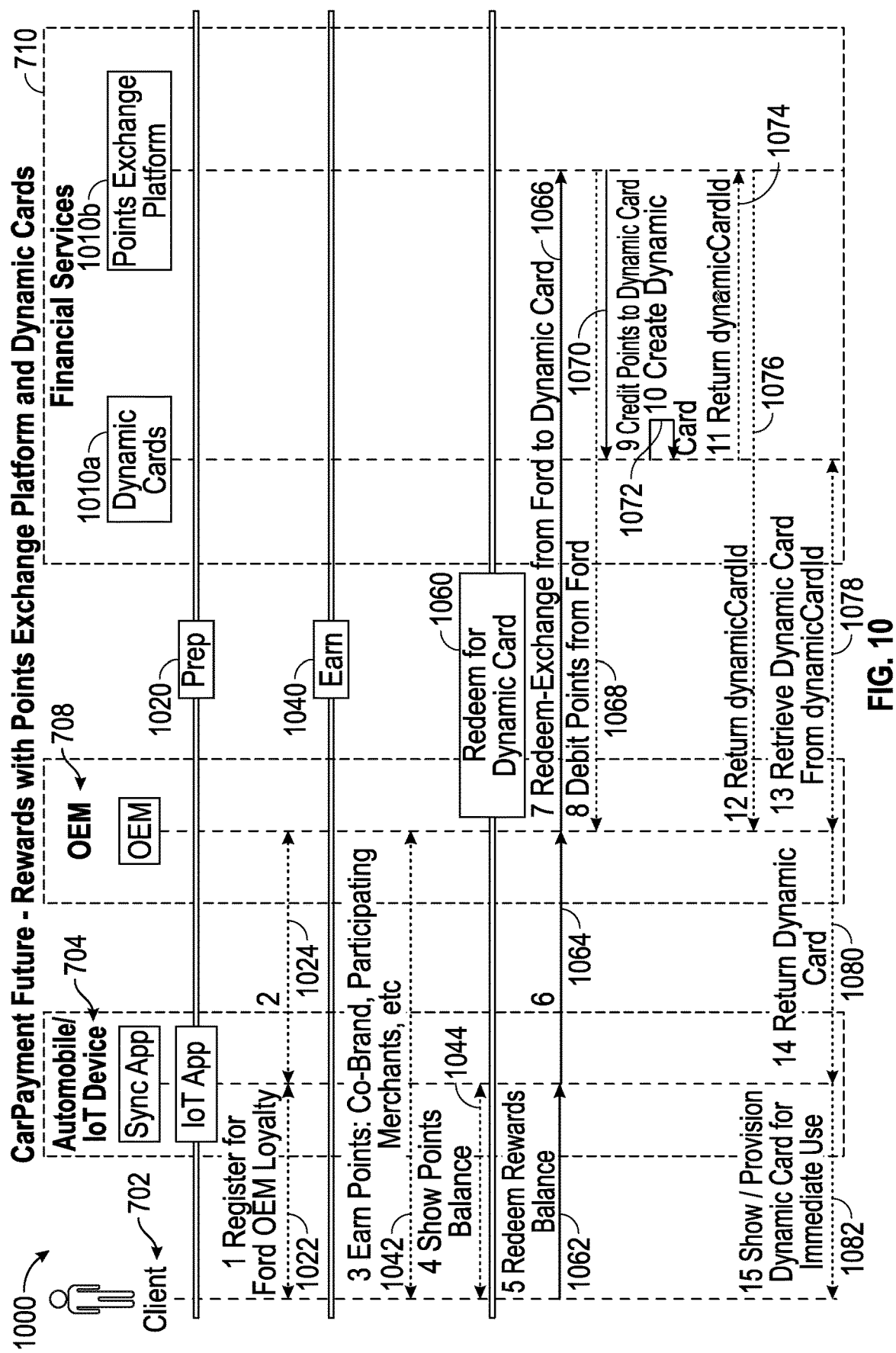
FIG. 10 illustrates, in a call flow diagram, another example of a method of making an electronic payment using an IoT device, in accordance with some embodiments.

FIG. 10 illustrates, in a call flow diagram, another example of a method of making an electronic payment using an IoT device 1000, in accordance with some embodiments. The method 1000 involves the use of rewards with points exchange platform and dynamic cards. While the example provided is described with respect to payments made using via vehicles for a service to the vehicle, the method 1000 may be applied to IoT devices generally. The method 1000 comprises preparation 1020, earning 1040 and redeeming 1060.

The preparation 1020 includes the client 702 using 1022 the IoT device 704 to register 1024 for OEM loyalty points. The earning 1040 includes the client 702 having earned points 1042 (including co-brand, participating merchants, etc.) with the OEM 708. The IoT device 704 may display 1044 the points balance to the client 702.

The redemption 1060 comprises the client 702 using 1062 the IoT device 704 to send a redeem rewards balance message 1064 to the OEM 708, which in turn, sends a redeem-exchange from OEM to dynamic card message 1066 to a points exchange platform 1010*b* of a financial service 710. The points exchange platform 1010*b* send a debit points from OEM message 1068 to the OEM 708, and a credit points to dynamic card message 1070 to a dynamic card platform 1010*a* of the financial service 710. The dynamic card platform 1010*a* generates 1072 an OEM dynamic card and returns 1074 the dynamic card ID to the points exchange platform 1010*b* to return 1076 to the OEM 708. Using the dynamic card ID, the OEM may then retrieve 1078 the dynamic card details from the dynamic card platform 1010*a*, to return 1080 to the IoT device 704. The dynamic card may now be shown/provisioned 1082 for use by the client 702. Other steps may be added to the method 1000.

Figure 11:
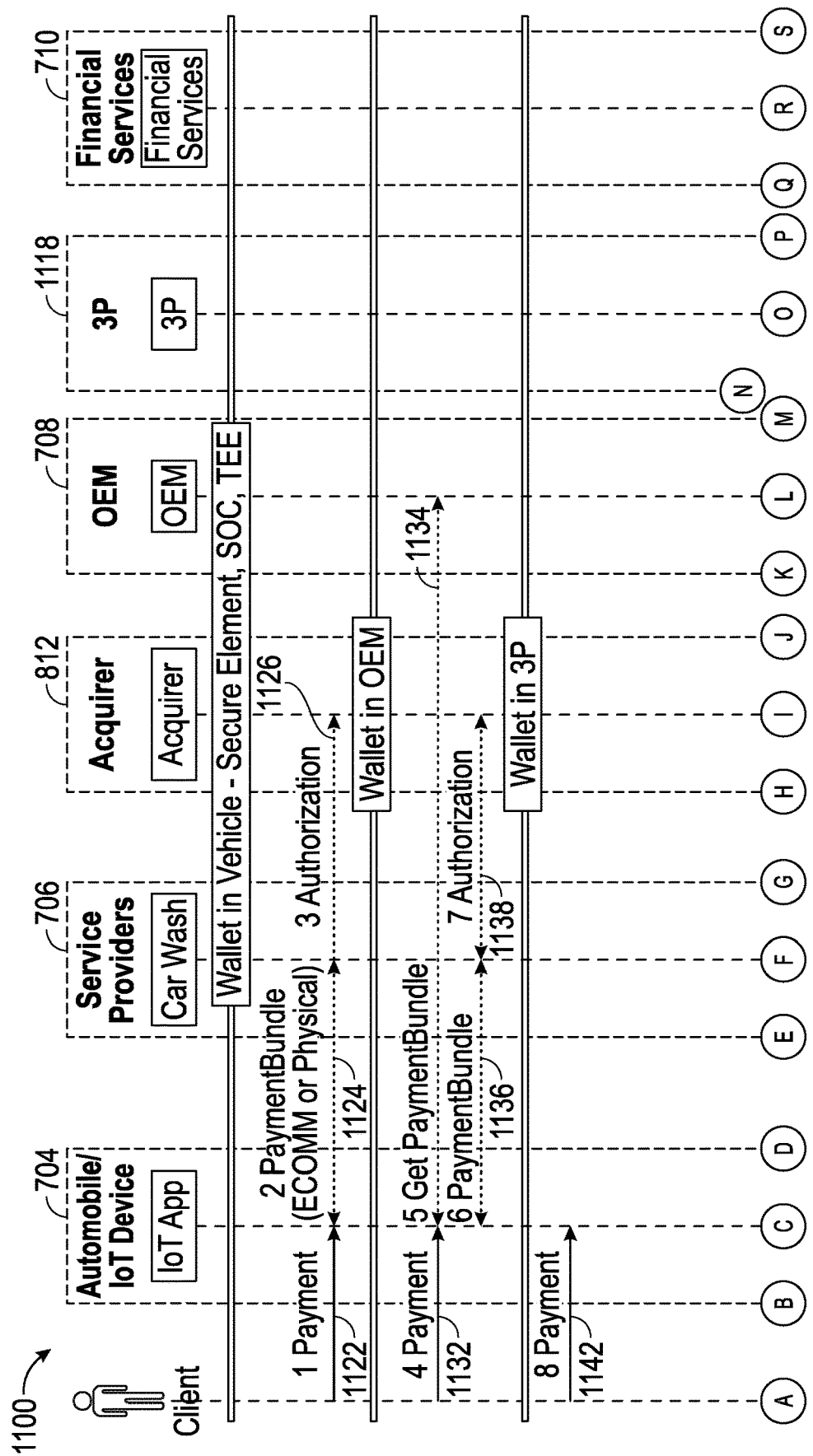
FIG. 11 illustrates, in a call flow diagram, another example of a method of making an electronic payment using an IoT device, in accordance with some embodiments.
Figure 11:
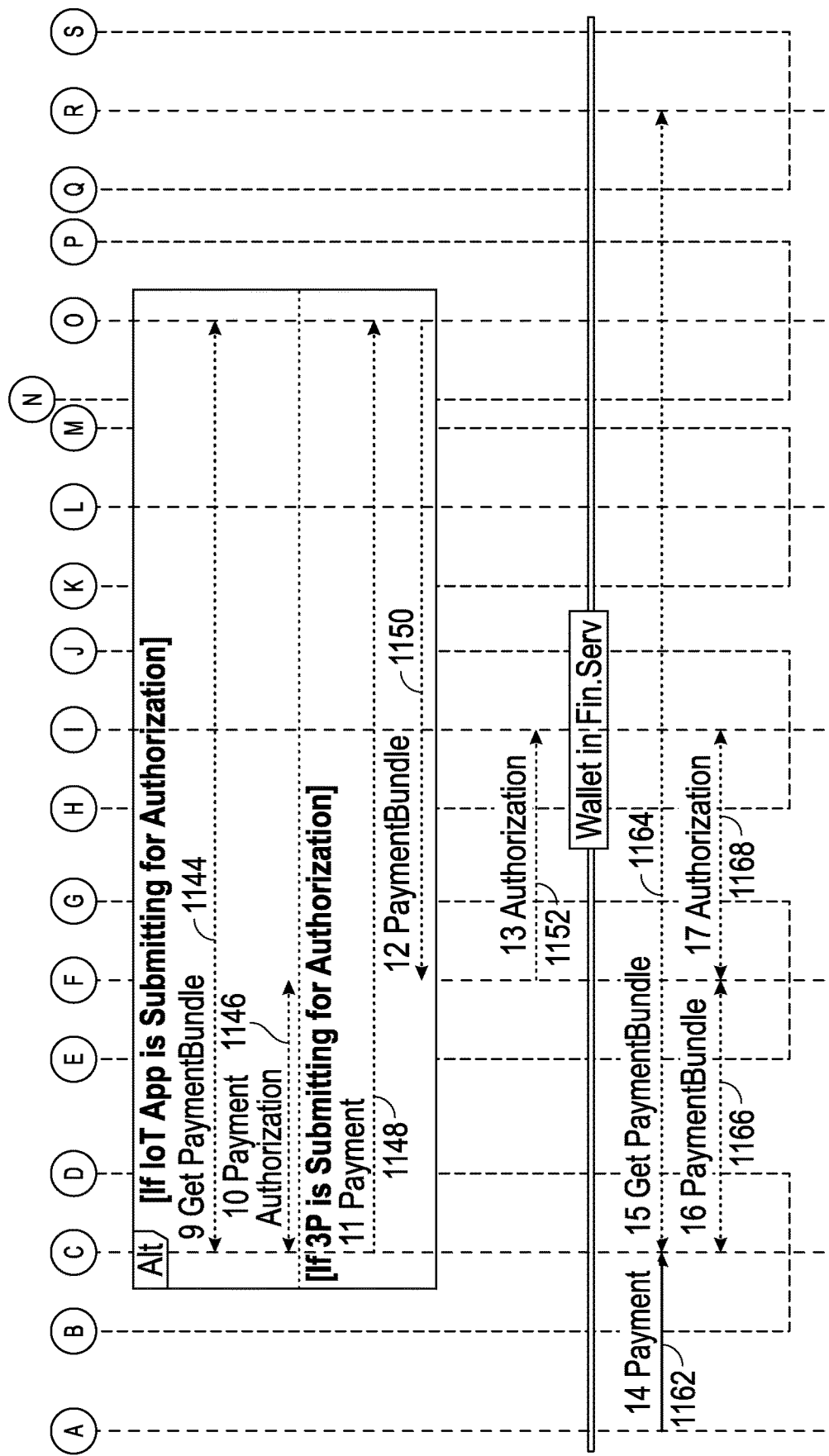

FIG. 11 illustrates, in a call flow diagram, another example of a method of making an electronic payment using an IoT device 1100, in accordance with some embodiments. While the example provided is described with respect to payments made using via vehicles for a service to the vehicle, the method 1100 may be applied to IoT devices generally. The method 1100 involves the use of an electronic wallet located at a secure element in at least one of an IoT device 704, an OEM server 708, a third party 1118 and/or in a financial service provider server 710. The method 1000 comprises preparation 1020, earning 1040 and redeeming 1060.

In the case of the wallet located at a secure element of an IoT device (e.g., a TEE), the client 702 uses 1122 the IoT device 704 to initiate 1124 an electronic payment with a service provider 706. The service provider 706 may then send an authorization message 1126 to an acquirer 812.

In the case of the wallet located at an OEM server 708, the client 702 uses 1132 the IoT device 704 to initiate a payment. The IoT device obtains 1134 payment details from the OEM server 708, and sends 1136 the payment details to the service provider 706. The service provider 706 may then send an authorization message 1138 to the acquirer 812.

In the case of the wallet located at a third party 1118, the client uses 1142 the IoT device 704 to initiate a payment. In some embodiments, the IoT device 704 may obtain 1144 payment details from the third party server 1118 and then send 1146 a payment authorization message 1148 to the service provider 706. In alternative embodiments, the IoT device 704 may send payment to the third party server 1118, that in turn sends 1150 payment details to the service provider 706. The service provider 706 may then send an authorization request message 1152 to the acquirer 812.

In the case of the wallet located at a financial service server 710, the client uses 1162 the IoT device 704 to initiate a payment. The IoT device 704 obtains 1164 payment details from the financial service 710 and sends 1166 the payment details to the service provider 706. The service provider 706 may then send an authorization request message 1168 to the acquirer 812. Other steps may be added to the method 1100.

It should be noted that at least one of the IoT device 704, service provider server 706, OEM server 708, third party server 1118, or financial service server 710 may be a data agent of a VCR, and thus, may participate in the data exchange of a multiparty secure environment platform. In this manner, data relevant to IoT devices 704 may be shared/access amongst the parties to the VCR without needing to pass or expose identifiable information regarding any IoT device 704. The shared information may allow for more robust data analysis leading to more robust service that would not be available without the data exchange.

Figure 12:
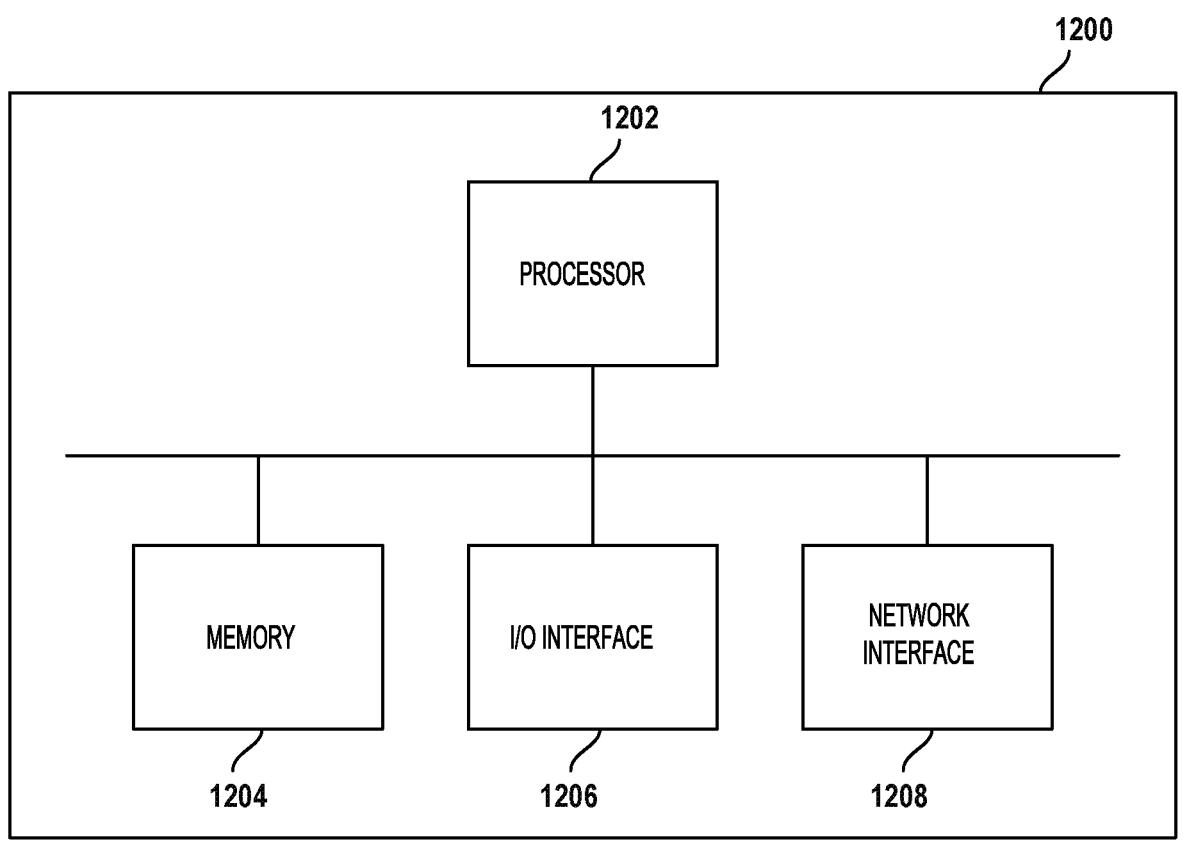
FIG. 12 is a schematic diagram of a computing device such as a server.

FIG. 12 is a schematic diagram of a computing device 1200 such as a server or other computer in a device such as a vehicle. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As can be understood, the examples described above and illustrated are intended to be exemplary only.

What is claimed is:

1. A system for processing electronic transactions, the system comprising:
   at least one processor of a first device; and
   a memory comprising instructions which, when executed by the processor, configure the processor of the first device to:
   obtain a proximity information of a second device from a GPS or Bluetooth unit on the second device, or from a third device in wireless communication with the second device;
   receive an electronic offer pertaining to a service to the second device when the second device is in proximity to a merchant device providing the service;
   responsive to receiving the electronic offer, obtain device information of the second device, the obtained device information comprising secure identifier information of the second device for authenticating a user of the second device;
   transform the proximity information of the second device into a data set representing an expected location of the second device using a first neural network trained on one or more data sets representative of one or more locations or proximities for generating predictions for new locations or proximities, the first neural network extracting one or more features of the proximity information into the data set representing the expected location of the second device;
   generate a credential token based on the device information of the second device and the data set representing the expected location of the second device, the credential token comprising a cryptogram based on the expected location of the second device and an encryption key;
   encrypt and store the credential token into a secure enclave storage of the second device using the encryption key;
   generate a request for an electronic transaction between the first device and the merchant device for the electronic offer or the service for the second device;
   decrypt and obtain the credential token from the secure enclave storage of the second device;
   when the second device is within a predetermined distance of the first device, authenticate the second device and the user using the cryptogram from the credential token based on the proximity information of the second device and the secure identifier information of the second device;
   generate and route to the merchant device a merchant transaction payment authorization data set representing authorization to process the electronic transaction between the first device and the merchant device;
   process the electronic transaction between the first device and the merchant device, using the credential token; and
   receive a transaction confirmation data set generated and routed from the merchant device providing acknowledgement of completion of the electronic transaction between the first device and the merchant device.

2. The system as claimed in claim 1, wherein the second device is an Internet of Things (IoT) device or a vehicle.

3. The system as claimed in claim 1, wherein the device information is credential information from the second device.

4. The system as claimed in claim 1, wherein the at least one processor is configured to:
authenticate the credential token.

5. The system as claimed in claim 1, wherein the merchant transaction payment authorization data set comprises at least one of a prepaid payment token and instructions to charge a payment funding source for payment to fully process the electronic transaction.

6. The system as claimed in claim 1, wherein the at least one processor is configured to:
receive a service code in response to the electronic transaction; and
process an electronic transaction for a service using the service code.

7. The system as claimed in claim 1, wherein the at least one processor is configured to:
receive transaction credit for the electronic transaction for at least one of the offer or service.

8. The system as claimed in claim 1, wherein the at least one processor is configured to:
retrieve stored transaction credit for the electronic transaction for the offer; and
process the electronic transaction in part using the stored transaction credit.

9. The system as claimed in claim 1, wherein the electronic transaction is an approval to open a door.

10. The system as claimed in claim 1, wherein the predetermined distance is a range in which the second device may wirelessly communicate with the first device.

11. A computer-implemented method of processing electronic transactions, the method comprising:
obtaining a proximity information of a second device from a GPS or Bluetooth unit on the second device, or from a third device in wireless communication with the second device;
receiving, at a first device, an electronic offer pertaining to a service to the second device when the second device is in proximity to a merchant device providing the service;
responsive to receiving the electronic offer, obtaining device information of the second device, the obtained device information comprising secure identifier information of the second device for authenticating a user of the second device;
transforming the proximity information of the second device into a data set representing an expected location of the second device using a first neural network trained on one or more data sets representative of one or more locations or proximities for generating predictions for new locations or proximities, the first neural network extracting one or more features of the proximity information into the data set representing the expected location of the second device;
generating a credential token based on the device information of the second device and the data set representing the expected location of the second device, the credential token comprising a cryptogram based on the expected location of the second device and an encryption key;
encrypting and storing the credential token into a secure enclave storage of the second device using the encryption key;
generating a request for an electronic transaction between the first device and the merchant device for the electronic offer or the service for the second device;
decrypting and obtaining the credential token from the secure enclave storage of the second device;
when the second device is within a predetermined distance of the first device, authenticating the second device and the user using the cryptogram from the credential token based on the proximity information of the second device and the secure identifier information of the second device;
generating and routing to the merchant device a merchant transaction payment authorization data set representing authorization to process the electronic transaction between the first device and the merchant device;
processing the electronic transaction between the first device and the merchant device, using the credential token; and
receiving a transaction confirmation data set generated and routed from the merchant device providing acknowledgement of completion of the electronic transaction between the first device and the merchant device.

12. The computer-implemented method as claimed in claim 11, wherein the second device is an Internet of Things (IoT) device or a vehicle.

13. The computer-implemented method as claimed in claim 11, wherein the device information is credential information from the second device.

14. The computer-implemented method as claimed in claim 11, comprising:
authenticating the credential token.

15. The computer-implemented method as claimed in claim 11, wherein the merchant transaction payment authorization data set comprises at least one of a prepaid payment token and instructions to charge a payment funding source for payment to fully process the electronic transaction.

16. The computer-implemented method as claimed in claim 11, comprising:
receiving a service code in response to the electronic transaction; and
processing an electronic transaction for a service using the service code.

17. The computer-implemented method as claimed in claim 11, comprising:
receiving transaction credit for the electronic transaction for at least one of the offer or service.

18. The computer-implemented method as claimed in claim 11, comprising:
retrieving stored transaction credit for the electronic transaction for the offer; and
processing the electronic transaction in part using the stored transaction credit.

19. The computer-implemented method as claimed in claim 11, wherein the electronic transaction is an approval to open a door.

20. The computer-implemented method as claimed in claim 11, wherein the predetermined distance is a range in which the second device may wirelessly communicate with the first device.

* * * * *